US006082789A

United States Patent [19]
Wenk

[11] Patent Number: 6,082,789
[45] **Date of Patent: *Jul. 4, 2000**

[54] TEMPER DETERRENT WIRE SEAL

[75] Inventor: Joseph H. C. Wenk, Huntington Bay, N.Y.

[73] Assignee: American Casting & Manufacturing Corp., Planview, N.Y.

[ * ] Notice: This patent is subject to a terminal disclaimer.

[21] Appl. No.: 09/197,930

[22] Filed: Nov. 23, 1998

Related U.S. Application Data

[63] Continuation of application No. 08/784,408, Jan. 16, 1997, Pat. No. 5,871,243.

[51] Int. Cl.[7] .............................. F16D 27/30; A44B 1/04
[52] U.S. Cl. .......................................... 292/320; 24/136 K
[58] Field of Search ............................... 292/307 R, 320, 292/322, 329, 317, 315, 307 B; 24/16 PB, 136 K, 136 R, 115 G

[56] References Cited

U.S. PATENT DOCUMENTS

| | | | |
|---|---|---|---|
| 1,497,374 | 6/1924 | Jones | 292/315 |
| 1,863,041 | 6/1932 | Dessauer . | |
| 1,977,301 | 10/1934 | Bradford . | |
| 1,992,868 | 2/1935 | Krause . | |
| 2,287,109 | 6/1942 | Fay . | |
| 2,717,170 | 9/1955 | Percival et al. . | |
| 3,591,223 | 7/1971 | Eduardo de Lima Castro Neto . | |
| 3,980,332 | 9/1976 | King, Sr. . | |
| 4,278,281 | 7/1981 | Moberg . | |
| 5,048,881 | 9/1991 | Renfro . | |
| 5,114,196 | 5/1992 | Storer . | |

*Primary Examiner*—Flemming Saether
*Attorney, Agent, or Firm*—Hoffman & Baron LLP

[57] ABSTRACT

A seal for use with a flexible wire for providing visible evidence of tampering therewith includes a housing and a wire retaining key. The housing has two passageways for passage of the ends of the flexible wire therethrough so that the ends of the flexible wire extend beyond the boundaries of the housing. The housing also includes a keyway for receipt of the wire retaining key. The wire retaining key is inserted into the keyway and intersects the passageways so that the flexible wire passing through the housing is intercepted and bears against the wire retaining key. In this manner, the wire retaining key intercepts and deforms the flexible wire, whereby removal of the flexible wire from the housing is prevented. The key also preferably includes a detent which snaps into an engaging position within the housing when fully inserted therein. An audible snapping sound may preferably be heard to indicate that the detent is in the engaging position.

18 Claims, 14 Drawing Sheets

Fig. 1
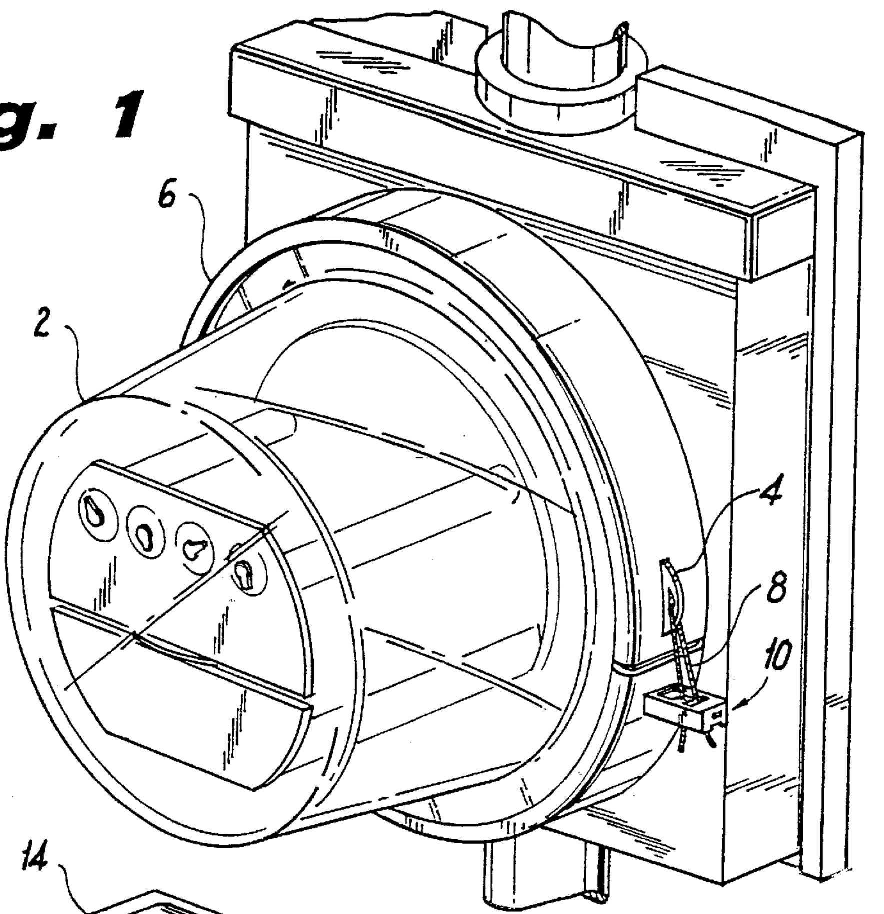
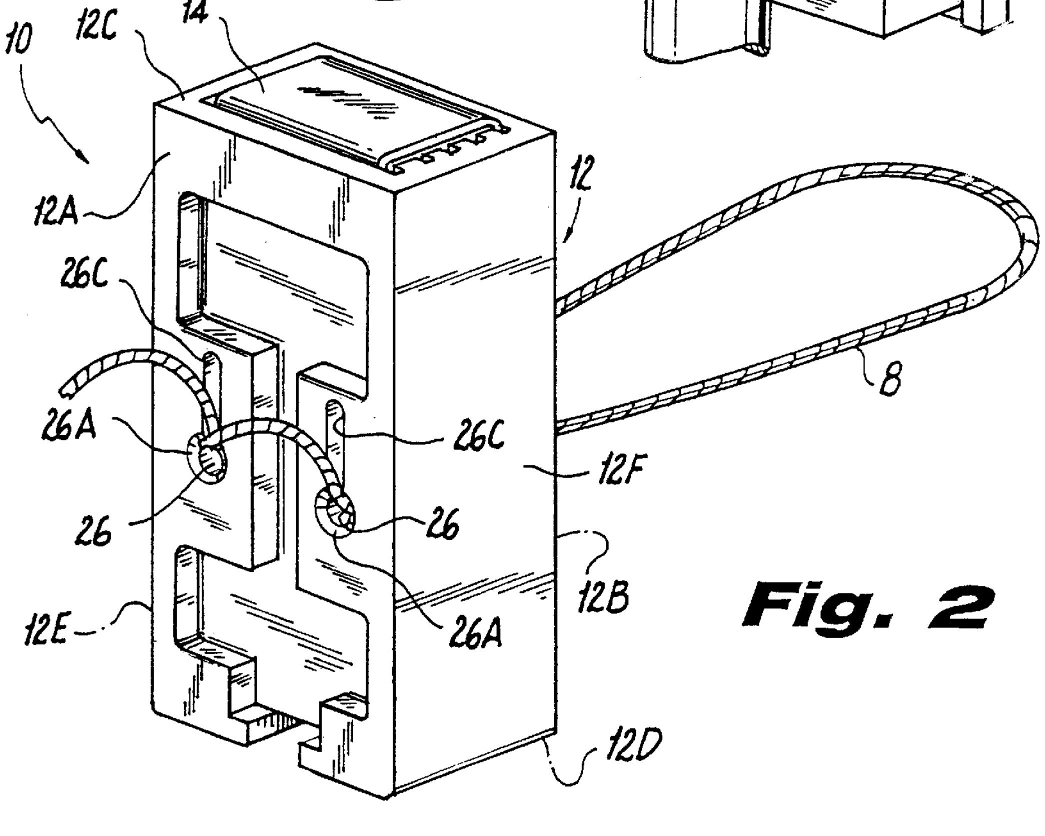
Fig. 2

Fig. 3
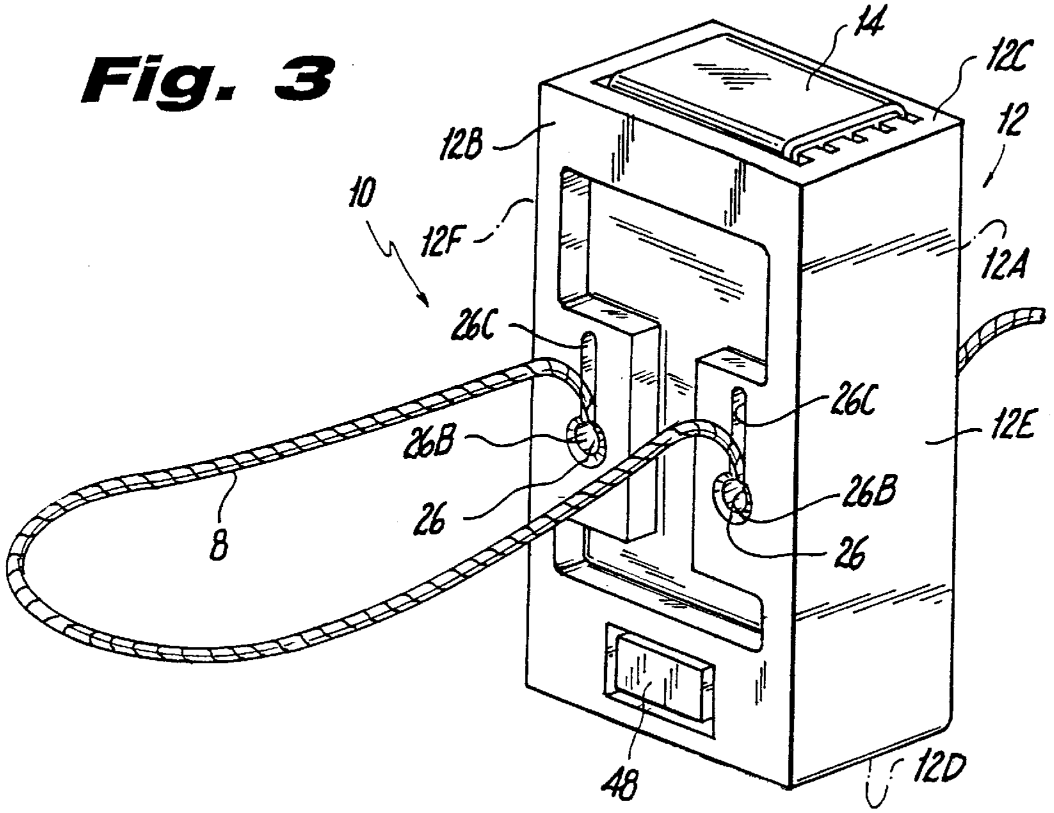
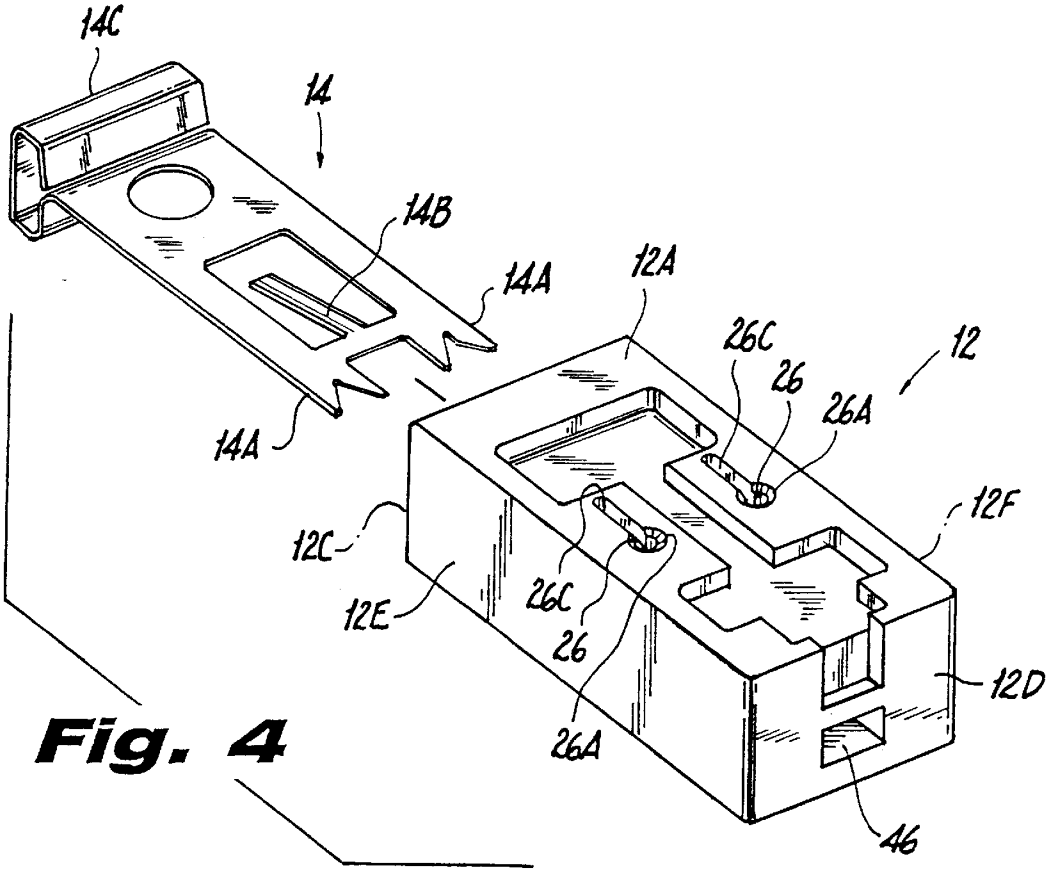
Fig. 4

Fig. 19
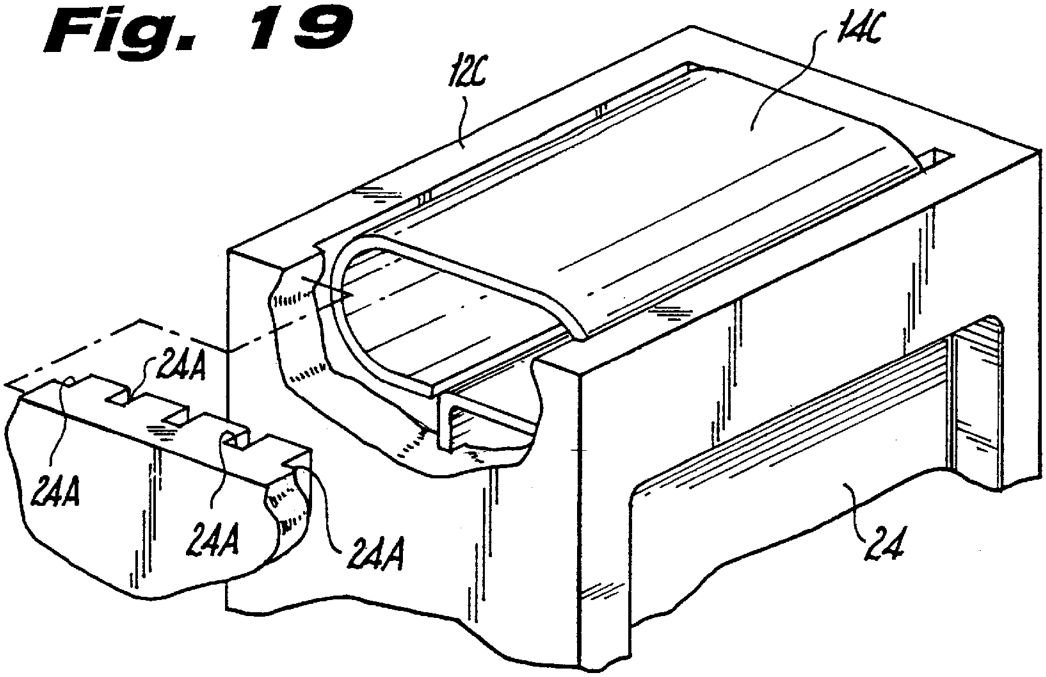
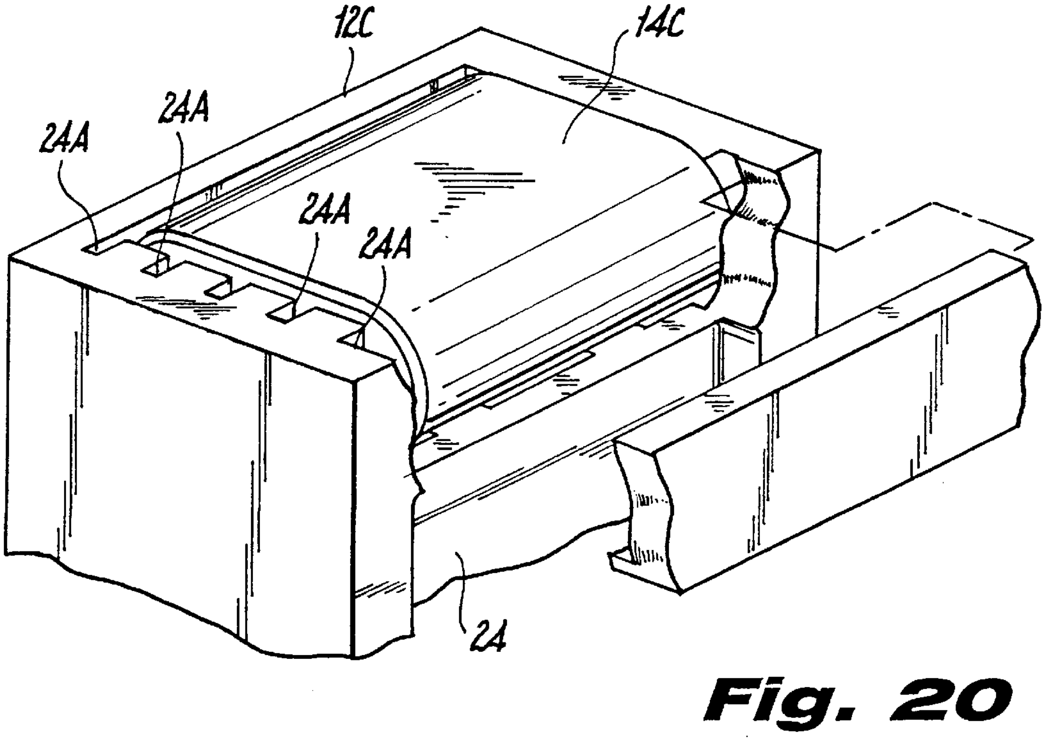
Fig. 20

TEMPER DETERRENT WIRE SEAL

CROSS REFERENCE TO RELATED APPLICATION

This application is a continuation of Ser. No. 08/784,408 filed on Jan. 16, 1997 now U.S. Pat. No. 5,871,243.

BACKGROUND OF THE INVENTION

The present invention relates generally to wire seals, and, more particularly, to wire seals which deter tampering with devices to which the wire seals are attached.

It is known that the theft of utilities, e.g., gas and electricity, from utility companies is a major source of financial loss each year for such companies. Even utility customers are perpetrators of this theft. One way of stealing services is by tampering with a utility meter which is installed at the customer's residence to measure and record the amount of gas or electricity consumed. In the case of electricity, an electrical watt-hour meter is typically installed at each customer's residence to measure and record the amount of electricity consumed by each customer in order that each customer may be accurately billed based on consumption level. However, dishonest customers tamper with the watt-hour meter in an effort to reduce the amount of consumption recorded thereon in order to correspondingly reduce their electric bill. Methods of tampering include bypassing the meter with conductive jumpers or reversing the polarity of the meter so that, as more electricity is used, the meter actually subtracts from the consumption level recorded. If the meter is returned to its normal operation just prior to the electric company reading it, the company will not be able to detect the customer's tampering with the meter.

Similar tampering is known to occur in other circumstances where other types of monitoring and/or recording equipment is installed at locations which prevent direct supervision by the equipment owner. Other devices which require prevention of tampering include shipping containers and the like. Shipping containers are normally left unattended by the owners of the contents for extended periods of time. Accordingly, sealing-type devices for providing visible evidence of tampering have been proposed in the prior art.

For instance, U.S. Pat. No. 1,863,041 to Dessauer discloses a device for sealing the ends of a string, cord or small wire in order to prevent the separation of the ends. The device is used to seal the ends of a cord which connects a tag to an article so that the tag can not be removed from the article. A two-part casing is disclosed which forms an inner area having a pair of resilient tongues formed therein. Further, a slide is disclosed as being contained in said casing. The slide has a notch and its own pair of resilient tongues formed thereon. In operation, the slide is removed from the casing so that the notch is accessible. The cord is wrapped around the slide in order to engage the notch. The slide is then forced inside the casing until the slide tongues engage the casing tongues and prevent the removal of the cord from the casing. Successful utilization of the Dessauer seal is dependent on correctly wrapping the cord around the slide before completely inserting the slide inside the casing. Disadvantageously, if a user of the seal does not properly engage the cord in the notch of the slide, the slide may not properly insert in the casing such that the respective tongues of the casing and the slide will not engage and, therefore, not prevent removal as intended.

A similar seal device is disclosed in U.S. Pat. No. 1,992,868 to Krause. The Krause reference also discloses a device which includes a case and a slide for sealing items such as car doors, heaters, tanks, hampers and the like. The slide has several holes passing therethrough as well as an inclined resilient latch. The case has a tubular form and has a keeper portion formed therein for engaging the inclined resilient latch of the slide. In operation, a link (i.e., similar to the cord used in the Dessauer device) is partially woven through certain of the holes formed in the slide. The slide is then partially inserted into the case where it temporarily engages the keeper in order to allow more of the link (cord) to be passed through the remaining holes on the slide. The slide is then completely inserted into the case and is held against removal by the keeper portion of the case. Again, proper operation of the seal disclosed in the Krause patent directly depends on how well the user follows the multiple steps associated with weaving the link among the holes in the slide.

U.S. Pat. No. 2,717,170 (Percival et al.) and U.S. Pat. No. 2,712,958 (Stelzer) disclose folding-type seals which are intended to be tamper resistant. The Percival et al. reference discloses a seal which includes three sections (a center section and first and second side sections) separated by weakened lines in the form of a scoring or groove. The cord to be sealed is laid over the center section and the first side section, having serrated flanges, is folded over and onto the center section such that the serrated flanges engage the cord and force the cord into the center section. The second side section is then folded over and onto the first side section and engages a shallow groove to keep the second side section flat against the first side section. If someone attempts to lift the top section, the weakened line will break and, thereby, provide evidence of the attempted tampering. Stelzer discloses a folding-type seal with only two sections; however, the general principle of operation is the same as that employed in the Percival et al. seal. One major disadvantage associated with the folding-type seal devices is that, if before being used, the sections are accidentally folded at the weakened score lines, the sections may break off at the time of use, thereby, rendering the device substantially useless.

Still further, a seal for meters and the like is disclosed in U.S. Pat. No. 3,980,332 to King. The King device includes a housing, a stiff spring wire shackle and a semi-resilient plastic keeper. The wire shackle is generally U-shaped with legs connected by a loop portion and with the free ends of the legs being inwardly and upwardly bent to form reversely bent hook portions. In operation, the wire shackle is passed through the hasp assembly of a meter and then inserted into a top opening of the housing until the hook portions bottom out on stops formed inside the housing. The keeper is then inserted into the opposite end of the housing so that notches formed thereon engage the hook portions of the wire shackle. Stops formed on the keeper engage the outside of the housing so that a bottom portion of the keeper remains outside the housing. It is intended that the only way for the seal to be broken is by breaking the bottom of the keeper along a perforation between the outside stops which allows the keeper and the wire shackle to be pushed out the top opening of the housing. The stiff construction of the portion which engages the meter hasp assembly, i.e, the wire shackle, is disadvantageous in that its lack of flexibility may make it difficult to install in tight compartments and more susceptible to accidental damage to the seal if the seal becomes caught on the clothing or other article of a passerby.

U.S. Pat. No. 5,114,196 to Storer discloses a similar locking device including a female member with apertures for threading a cable through whereby a male member is then inserted into a center aperture to forcibly retain the cable therein. However, the patent discloses that the cable must be thread through various apertures of the female member, at least four times, in order to properly ensure that the cable will be retained once the male member is fitted into the female member.

Similarly, U.S. Pat. No. 1,977,301 to Bradford discloses a seal which includes a cylinder with a cylindrical bore and circumferential groove formed therein. The Bradford seal discloses a plug with a pair of holes for allowing the ends of a band to be placed therethrough and a recess for receiving a splice that serves to connect the ends of the band after having been inserted through the holes of the plug. A spring ring is placed in a circumferential groove of the plug. Once the ends of the bands are placed through the plug and spliced, the plug is inserted into the bore of the cylinder whereby the spring ring placed in the groove of the plug engages the groove of the cylinder so that the plug can not be removed from the cylinder. Again, similar to the Storer device, extensive manipulation of the band or cord is required to secure it through one of the seal members. A single-use seal lock for mailbags is disclosed in U.S. Pat. No. 3,591,223 to Neto which includes a socket member and a plug which is insertable into the socket member. However, the seal has limited utility since the socket and plug secure a band therebetween, the band being formed as part of an existing mailbag.

U.S. Pat. No. 5,048,881 to Renfro discloses a lockable seal ring for specific use with an electric meter. However, the seal ring is of one-piece construction and completely surrounds the circumferential periphery of the meter and, thus, does not provide the general flexibility of a wire seal.

There is, therefore, a need in the prior art for a wire seal for use with meter devices, storage containers and the like which requires a minimal amount of simple steps to install and which may be easily installed in constrained environments. There is also a need for a wire seal which is less susceptible to accidental damage but which also provides readily visible evidence of intentional tampering therewith.

SUMMARY OF THE INVENTION

In its broadest aspect, the present invention is a seal for use with a flexible wire which substantially deters a person from tampering with an article or a piece of equipment to which the seal is attached.

The tamper deterrent wire seal of the present invention includes a housing having at least one passageway (and preferably two passageways) for passage of a flexible wire through the housing so that the flexible wire extends beyond the boundaries of the housing. The housing further includes a keyway for receiving a wire retaining key, whereby the keyway intersects the passageway so that a flexible wire, passing through the housing, is intercepted and bears against the wire retaining key inserted in the keyway. The wire retaining key is sized and shaped for insertion into the keyway of the housing in order to intercept and deform the flexible wire passing through the housing of the seal whereby removal of the flexible wire is prevented.

In a preferred embodiment of the present invention, the housing of the wire seal includes two passageways. In this manner, after being attached to the item to be secured by the seal, two ends of a flexible wire may be inserted through the passageways so that the ends extend beyond the boundaries of the housing.

The housing is preferably sufficiently fragile, e.g., made of breakable plastic, so that it may be easily broken when the wire is pulled in a direction for removal from the passageway. To this end, the walls of the housing can be constructed in such a manner that they are weakened to enhance the fragility of the seal so that the housing easily breaks upon tampering.

The housing of the present invention preferably has a silhouette which is substantially a rectangular parallelepiped. The housing preferably includes a top wall, a bottom wall, and two side walls joined to and extending between the top and the bottom walls to define a wire locking cavity having two ends. One of the two ends can be a “first end” for receiving the retaining key, and the other end can be a “second end” which is substantially closed. Still further, the first end preferably includes a cavern which is sized and shaped to receive a blocking shell. Particularly, the blocking shell is fixed on the retaining key whereby the cavity is rendered substantially inaccessible to unlocking tools.

The keyway can be formed in the cavity defined by the above-mentioned top wall, bottom wall, and side walls of the housing, such as by providing opposing slots formed in the inside surfaces of the side walls. The keyway can further include at least one top guiding rib member (and preferably two parallel rib members) protruding from the inside surface of the top wall and which extends linearly substantially the length of the top wall. Still further, a preferred keyway can also include at least one bottom guiding rib member (again, preferably two parallel rib members) protruding from the inside surface of the bottom wall and which extends linearly substantially the length of the bottom wall.

A key removal preventer can also be provided in the wire locking cavity, e.g., a no-return abutment against which the retaining key engages upon insertion into the cavity. The abutment can simply be a receiving surface facing only one of the ends of the housing. The receiving surface is preferably part of a notch formed in the inside surface of one of the walls which define the wire locking cavity.

In another embodiment of the present invention, the passageway formed in the housing preferably includes at least one entrance opening (and preferably two openings) having a wire deformation relief notch. Further, the passageway may also preferably include at least one exit opening having a wire deformation relief notch similar to that described above and, as above, there are preferably two such exit openings.

A retaining key of the present invention preferably includes a planar elongate body having a wire engaging portion which bears against and deforms a flexible wire when inserted in the housing in order to prevent removal of the wire from the passageway. Such wire engaging portion preferably includes a generally V-shaped notch having two sides which meet at a wire retaining convergence. Further, each of the two sides are preferably formed of a compound angle having at least two receiving angles for receipt of and directing the flexible wire to such convergence. In a preferred embodiment, the convergence is arcuately shaped. The planar elongate body of the retaining key also preferably includes a first end and a second end, and the wire engaging portion is provided at the first end. Preferably, the second end can be provided with a blocking shell which prevents entry into the housing when the retaining key is inserted in the keyway.

A no-return mechanism separate from the wire engaging portion is also provided. The no-return mechanism permits insertion of the retaining key into the keyway but prevents removal of the retaining key after insertion into the keyway. In a preferred embodiment of the present invention, the no-return mechanism includes a detent which is compressed to a non-engaging condition during insertion and which springs to an engaging position upon complete insertion into the keyway. As the detent springs into the engaging position, an audible indication (e.g. a snapping or clicking sound) is preferably provided to indicate to the user that the key is in a fully inserted position. If no audible indication is heard, then the user is alerted that the key is not correctly or fully inserted.

In yet another embodiment, when the substantially closed second end includes a small opening formed therein during the manufacturing process and which allows access to the cavity, one of the adjacent walls can be provided with a plug which can be inserted to block access to the cavity from the opening. Preferably, the plug is a portion of the wall, and has reduced side connections to the wall for fracturing under force to move the plug into a blocking position.

In still a further embodiment of the present invention, a seal for use with a flexible wire includes a housing, whereby the housing includes a keyway for receipt of a wire retaining key and at least one passageway for passage of the wire through the housing and for intersecting the keyway. The at least one passageway has an entrance opening and an opposing exit opening, whereby either the entrance opening or the exit opening has a wire deformation relief notch. The wire deformation relief notch is formed as a break in the body of the housing immediately adjacent and continuous with the passageway. The break provides relief for movement of a flexible wire while being subjected to deformation during insertion of the key. Preferably the notch includes a surface sloping toward the surface of the housing. The wire seal of this embodiment also includes a wire retaining key which is sized and shaped for insertion into the keyway to intercept and deform the wire.

Still referring to this particular embodiment of the present invention, when a flexible wire passing through the passageway is intercepted by a retaining key, the relief notch permits less severe deformation of the wire whereby complete insertion of the retaining key is facilitated.

Both the entrance opening and the exit opening of the at least one passageway can be provided with a wire deformation relief notch. Two passageways can also be provided, each with an entrance opening and an exit opening having a wire deformation relief notch.

As a result, the present invention provides a wire seal which advantageously provides visible evidence of tampering (i.e., fracturing of the housing) therewith and/or tampering with the device to which the seal is attached. Due to its flexibility, the present invention requires a minimal amount of steps to install and is less susceptible to accidental damage. The present invention also provides a wire deformation relief notch feature which facilitates deformation and, thus, securement of a flexible wire in the housing of the seal upon insertion of a wire retaining key. The present invention further provides a punch plug feature which prevents access to the wire locking cavity of the housing. The present invention provides a retaining key having separate wire engaging and key removal prevention features. The present invention also provides a retaining key with a compound angle formed thereon for guiding and securing the flexible wire in the housing.

It is to be appreciated that the types of devices with which the wire seal of the present invention may be used are varied. For instance, a wire seal formed in accordance with the present invention may be used in conjunction with an electrical watt-hour meter to deter various forms of tampering known to occur with such meters. Alternatively, the wire seal of the present invention may be employed, in a similar manner, to prevent tampering with other types of equipment, as well as such things as storage containers and the like. It is to be appreciated that yet further applications of the novel tamper deterrent wire seal of the present invention may be contemplated by the skilled artisan.

For better understanding of the present invention, together with other and further objects and advantages, reference is made to the following description, taken in conjunction with the accompanying drawings, and its scope will be pointed out in the appended claims.

BRIEF DESCRIPTION OF THE DRAWINGS

FIG. 1 is a perspective view of a preferred embodiment of the present invention installed on an electric meter;

FIG. 2 is a perspective view of the top of a wire seal of the present invention fully assembled;

FIG. 3 is a perspective view of the bottom of the assembled wire seal of the present invention;

FIG. 4 is a perspective exploded view of the components of the wire seal shown in FIGS. 2 and 3;

FIG. 19 is a partial cutaway view illustrating a weakened wall feature of the present wire seal;

FIG. 20 is another partial cutaway view also illustrating the weakened wall feature of the present wire seal;

DETAILED DESCRIPTION OF THE PREFERRED EMBODIMENTS

Figure 6:
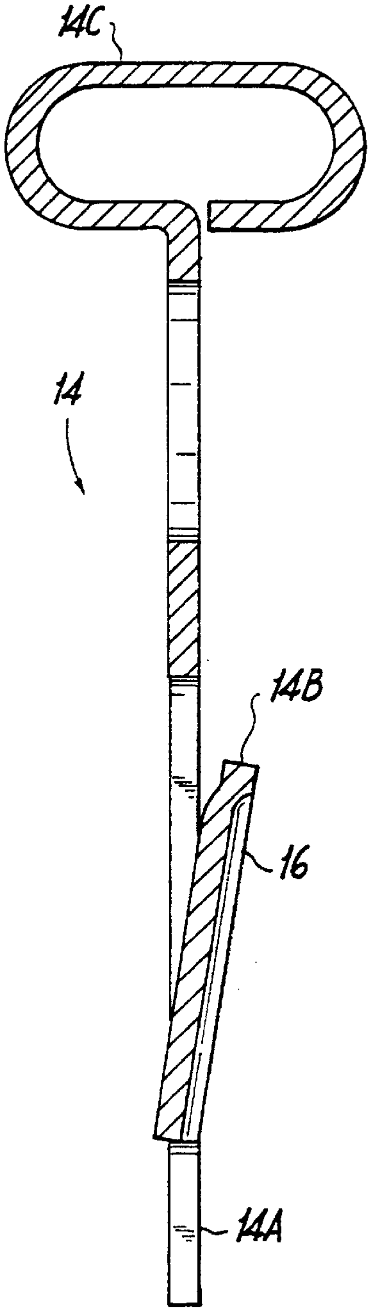
FIG. 6 is a side cross-sectional view of the wire retaining key taken through line 6—6 of FIG. 5.

Referring to the drawings, FIG. 1 shows a preferred form of a wire seal 10 installed on an electric meter 2 to prevent tampering with the electric meter 2. The electric meter 2 includes a hasp 4 and a collar 6 whereby the hasp 4 passes through an opening in the collar 6. A flexible wire 8 passes through the hasp 4 and is secured against removal in the wire seal 10 of the present invention. Any attempt to tamper with the electric meter 2 requires removal of the collar 6; however, removal of the collar 6 requires removal of the flexible wire 8 and wire seal 10 from the hasp 4. But, as will be explained in greater detail below, any attempt to remove the flexible wire 8 from the wire seal 10 will result in substantial damage to the wire seal 10 and, thus, provide readily visible evidence of tampering. Of course, cutting the flexible wire 8 from the hasp 4 will also result in obvious evidence of tampering.

Referring now to FIGS. 2 and 3, top and bottom perspective views, respectively, of the wire seal 10 of the present invention are shown. The wire seal 10 includes a housing 12 which is substantially a rectangular parallelepiped defined by a top wall 12A, an opposing bottom wall 12B, a front end 12C, an opposing back end 12D and opposing side walls 12E and 12F. The wire seal 10 also includes a wire retaining key 14 shown fully inserted in the housing 12 to secure the flexible wire 8 against removal from the housing 12. FIG. 4 shows the wire retaining key 14 removed from the housing 12. The wire retaining key 14 has a planar elongate body which includes a wire engaging portion 14A, a no-return mechanism 14B and a blocking shell 14C.

Figure 5:
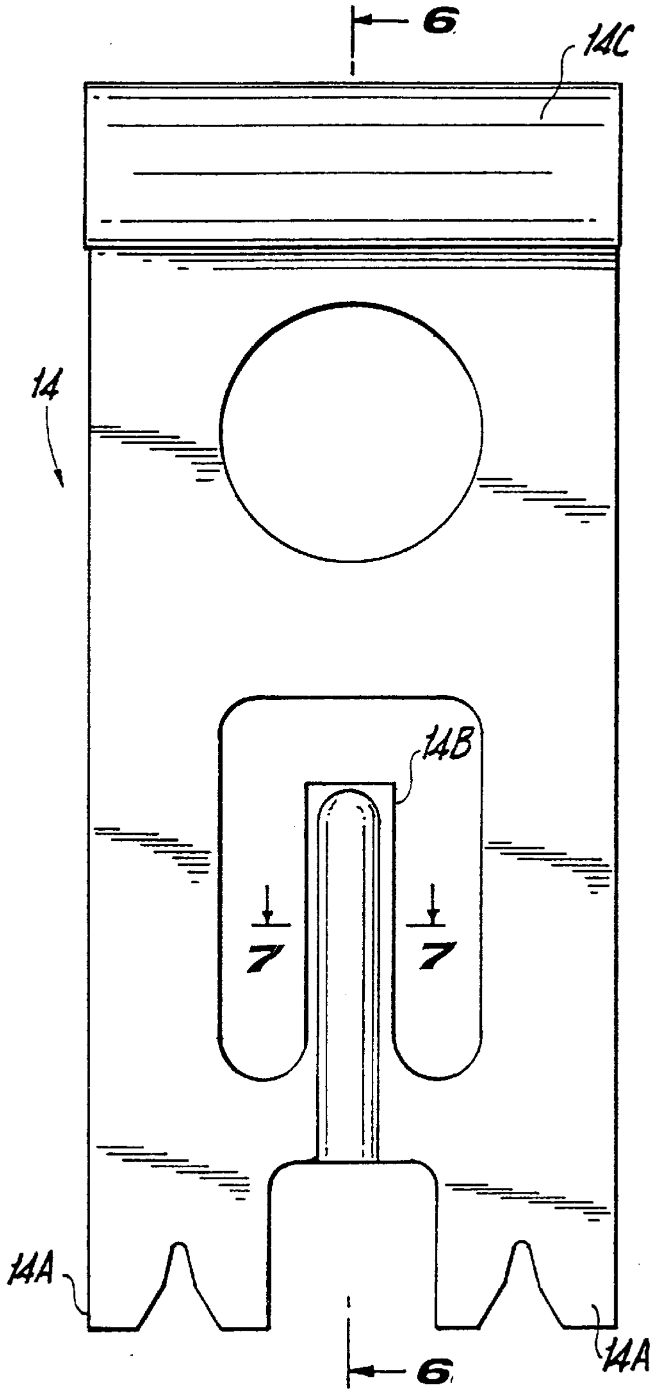
FIG. 5 is a top plan view of a wire retaining key of the inventive wire seal.

The unique structure of the wire retaining key 14 is best seen in FIGS. 5 and 6. Specifically, the wire engaging portion 14A and the blocking shell 14C are respectively formed at the bottom and top of the key 14, while the no-return mechanism 14B is formed therebetween. The wire retaining key 14 is shaped so that it is easy to insert into the housing 12 yet, once inserted therein, it is impossible to remove without damaging the housing 12. The key 14 is preferably composed of a metal or other suitable material which is sufficiently flexible so as to facilitate insertion into the housing 12, but which is sufficiently rigid to prevent attempts at bending the key 14 to remove it from the housing 12. The entire key 14 is preferably formed, e.g., stamped, from a single piece of metal in order to facilitate manufacture thereof.

Figure 7:
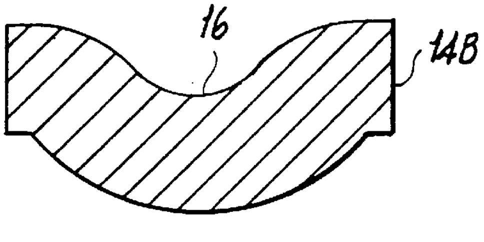
FIG. 7 is a cross-sectional view of a no-return mechanism of the wire retaining key taken through line 7—7 of FIG. 5.

The no-return mechanism 14B, as shown in FIGS. 5 and 6, is preferably in the form of a detent which is stamped out during manufacturing of the key. The detent 14B is shown as a tab which points in the direction of the blocking shell 14C. After the key is stamped, the detent 14B is slightly bent at an angle with respect to the plane of the body of the key 14, as shown in FIG. 6. As will be explained later in greater detail, the detent 14B is angularly displaced in this manner to prevent removal of the key 14 from the housing 12. The detent 14B, itself, preferably has a flute 16 (i.e., rounded groove) formed therein which preferably extends substantially the length of the detent. The shape of the flute 16 is best seen through the cross sectional view of FIG. 7, which is taken along line 7—7 in FIG. 6. One reason for forming a flute in the detent is to enhance the rigidity of the detent.

Figure 8B:
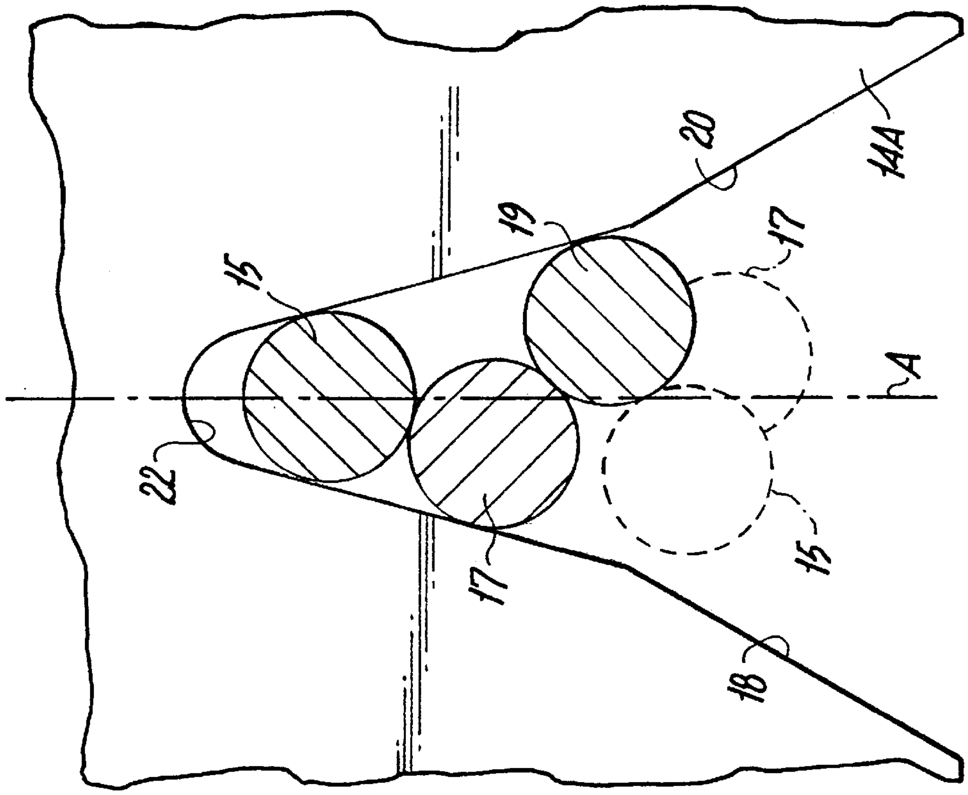
FIG. 8B is a further enlarged fragmentary plan view of the wire engaging portion of FIG. 8A illustrating the engagement of the flexible wire therewith.
Figure 8A:
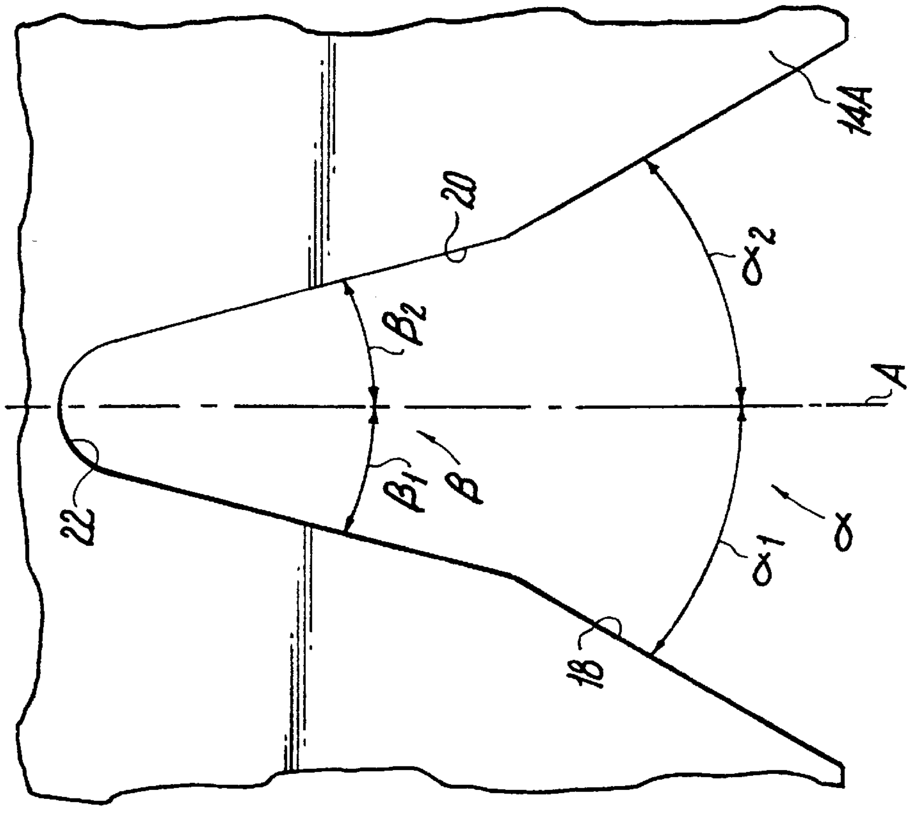
FIG. 8A is an enlarged fragmentary plan view of a wire engaging portion of the wire retaining key of FIG. 5.

FIG. 8A shows an enlarged view of one of the generally V-shaped notches which are primary features of the wire engaging portion 14A of the wire retaining key 14. The wire engaging portion 14A is formed by two generally V-shaped notches, each notch having two sides 18 and 20 which begin at one end of the key 14 and meet at a wire retaining convergence 22. The convergence 22 is preferably arcuately shaped. The two sides 18 and 20 are shaped so as to define a compound angle, that is, an angular shape having at least two angles associated therewith. The multiple angles facilitate both the receipt of the flexible wire 8 by the wire engaging portion 14A and the directing of the flexible wire 8 into the wire retaining convergence 22.

As shown in FIGS. 8A, the nonlinear side 18 forms an angle $\alpha_1$ and an angle $\beta_1$ with phantom line A, which bisects the convergence 22. Similarly, the nonlinear side 20 forms an angle $\alpha_2$ and an angle $\beta_2$ with phantom line A. Accordingly, the compound angle of the wire engaging portion 14A is formed by two separate receiving angles $\alpha$ and $\beta$, the first receiving angle a being defined as the sum of the individual angles $\alpha_1$ and $\alpha_1$, while the second receiving angle $\beta$ is defined as the sum of the individual angles $\beta_1$ and $\beta_2$. As shown in FIG. 8A, the first receiving angle $\alpha$ is wider and diverging farther away from the wire retaining convergence 22 than the second receiving angle $\beta$, which is narrower and which directly terminates in the wire retaining convergence 22. Preferably, angle $\alpha_1$ is equal to angle $\alpha_2$ and each angle is equal to approximately 30 degrees. In this manner, the first receiving angle $\alpha$ is preferably equal to approximately 60 degrees. Likewise, angle $\beta_1$ is preferably equal to angle $\beta_2$ and each angle is equal to approximately 15 degrees. In this manner, the second receiving angle $\beta$ is preferably equal to approximately 30 degrees.

FIG. 8B shows the novel compression (e.g., deformation) effect that the compound angle of the wire engaging portion 14A has on the flexible wire 8 as the wire passes from the first receiving angle $\alpha$ to the second receiving angle $\beta$. A typical flexible wire used with the present invention is formed from three separate wire strands, denoted in FIG. 8B as strands 15, 17 and 19, which are interwoven or twisted together to form a single flexible wire. Each strand may typically have a diameter of approximately 0.015 inches such that the individual strands are interwoven to form a flexible wire having an overall diameter of approximately 0.030 inches. Given such a diameter of the flexible wire 8, the arcuately-shaped wire retaining convergence 22 is preferably formed to have a radius of approximately 0.006 inches and, therefore, a diameter of approximately 0.012 inches. In this manner, when the flexible wire 8 is intercepted by the wire engaging portion 14A of the wire retaining key 14 within the housing 12, the flexible wire 8 is deformed such that the individual strands 15, 17 and 19 are compressed within the convergence 22, as shown in FIG. 8B. By way of example, FIG. 8B shows an original position of the strands 15 and 17, in phantom lines, and then in a final compressed position, in solid lines. Also, strand 19 is exemplified as substantially remaining in the same position during the compression action; however, such is not necessary for the flexible wire 8 to be securely held by the notch of the wire engaging portion 14A.

Furthermore, the receiving angle β of the wire engaging portion 14A may be chosen so that sides 18 and 20, which form the angle, slightly cut into at least one of the strands (e.g., strand 15) of the flexible wire 8. Such preferred cutting action is accomplished by making the diameter of the wire retaining convergence 22 slightly smaller than the diameter of an individual wire strand, e.g., employing a convergence with a diameter of approximately 0.012 inches and a flexible wire having individual wire strands with respective diameters of approximately 0.015 inches.

Thus, due to the above-described compression or deformation of the strands of the flexible wire 8, the key 14 bears against the wire 8 and the wire 8 is secured by the key 14 against removal from the housing 12.

The blocking shell 14C of the wire retaining key 14 is preferably formed after the key is stamped by shaping the top portion of the key (i.e., opposite the bottom portion of the key having the compound angle) into a shape having a profile which substantially blocks entry into the cavity of the housing 12, once the key is fully inserted therein. While FIG. 6 shows a preferred cross-sectional profile of the blocking shell 14C, it is to be appreciated that other profiles may be employed which serve the same purpose.

Figure 9:
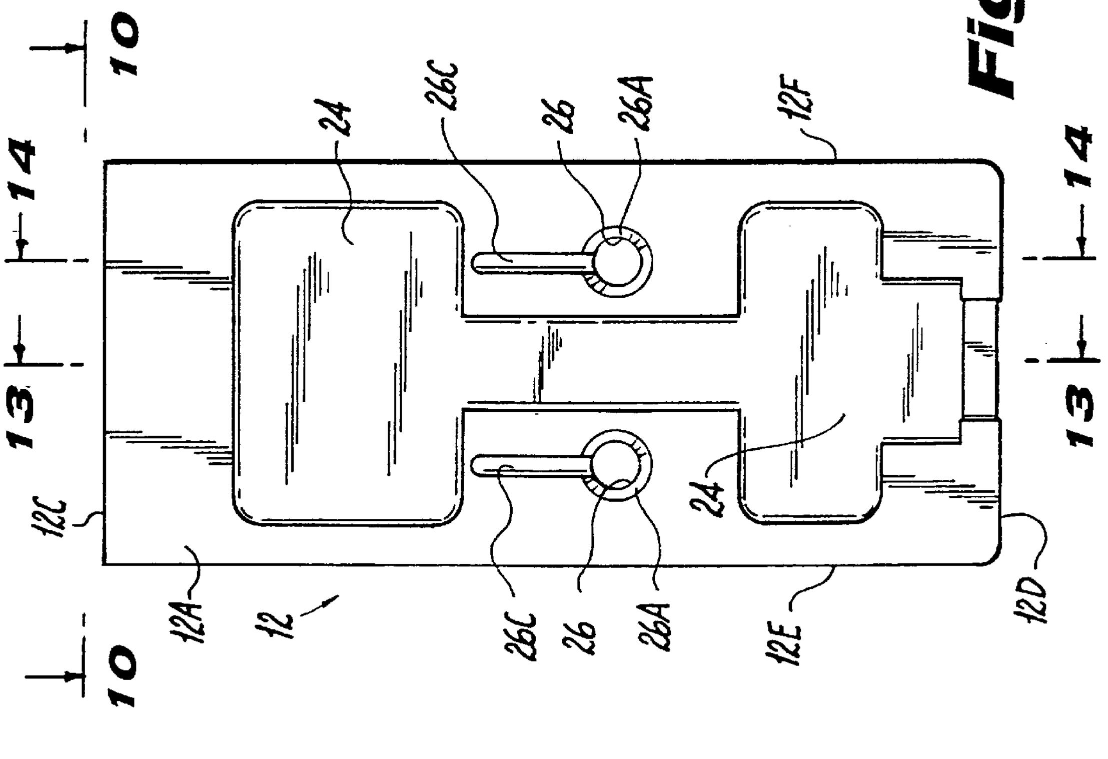
FIG. 9 is a plan view of the top of the housing of the inventive wire seal.
Figure 12:
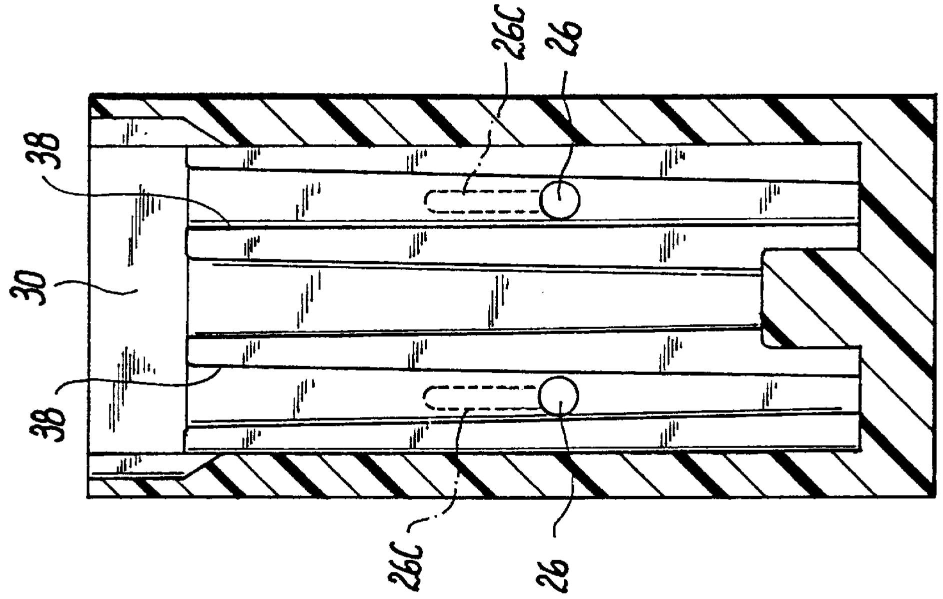
FIG. 12 is a cross-sectional plan view of the housing taken along line 12—12 of FIG. 10.

Referring now to FIGS. 9 through 14, a preferred form of the housing 12 of the wire seal 10 is shown. The housing 12 is preferably made of breakable plastic, so that the housing 12 will fracture if an attempt is made to remove either the flexible wire 8 or a fully-inserted wire retaining key 14 from the housing 12. To this end, a recess 24 is formed on an outer surface of the top wall 12A of the housing 12, as shown in FIGS. 2 and 9. The recess 24 serves to substantially weaken (i.e., enhance the fragility of) the top wall 12A so that it will break when an attempt is made to tamper with the wire seal 10. It is to be appreciated that a similar recess 24 is formed in an outer surface of the bottom wall 12B of the housing 12, as shown in FIG. 3. The fragility of the top and bottom walls may be substantially controlled during the manufacturing process by varying the area and/or depth of the recess 24 formed in the outer surfaces of the walls (e.g., larger area and/or greater depth yields a greater degree of fragility).

The housing 12 of the wire seal 10 also includes two passageways 26 which pass through the housing 12 from the top wall 12A to the bottom wall 12B. Each passageway 26 includes a first opening 26A formed in the top wall 12A and a second opening 26B formed in the bottom wall 12B. In this manner, after being attached to the item to be secured by the wire seal 10 of the present invention, two ends of a flexible wire 8 may be respectively inserted at, for example, the first openings 26A and through the passageways 26 so that the ends of the flexible wire 8 respectively extend from the second openings 26B and, thus, beyond the boundaries of the housing 12. It should be appreciated that the ends of the flexible wire 8 may just as easily be inserted through the second openings 26B so that they exit the housing at the first openings 26A.

Figure 14:
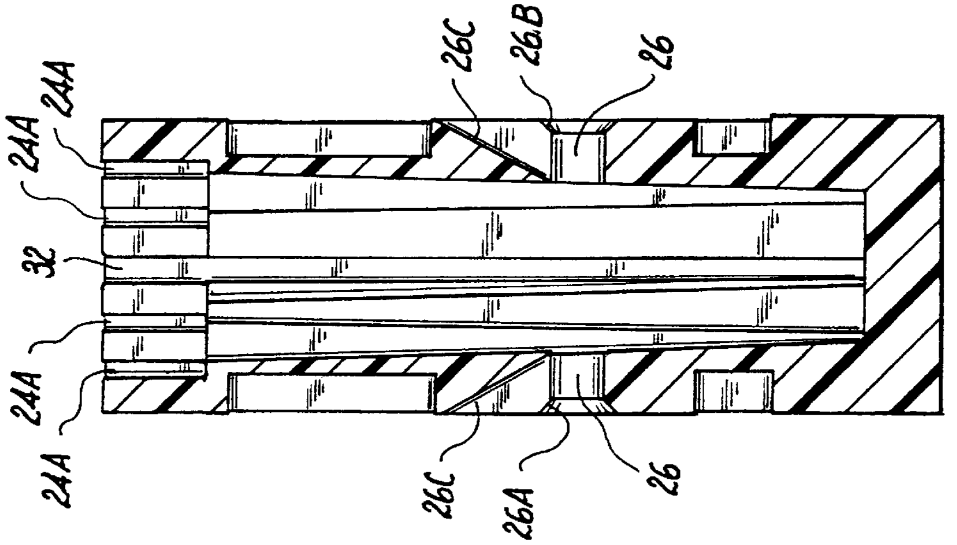
FIG. 14 is a cross-sectional side elevation view of the housing taken along line 14—14 of FIG. 9.

Each of the first and second openings 26A and 26B of the passageways 26 also include a wire deformation relief notch 26C, as shown in FIG. 14. Each wire deformation relief notch 26C is formed as a break in the body of the housing 12 immediately adjacent and continuous with the passageway 26. The break provides relief for movement of the flexible wire 8 while being subjected to deformation during insertion of the wire retaining key 14. Preferably, each notch 26C begins at a point in the passageway 26 intermediate the first and second opening and includes a surface sloping away from the direction of insertion of the key 14, i.e., in a direction substantially toward the front end 12C of the housing 12.

Figure 10:
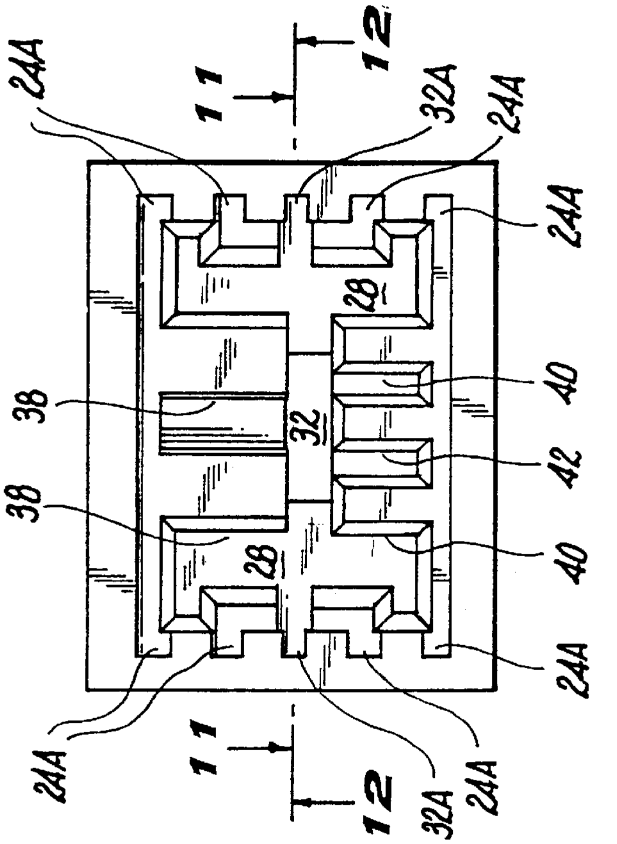
FIG. 10 is an elevation view of the front end of the housing taken through line 10—10 of FIG. 9.

The housing 12 further includes a wire locking cavity 28, as shown in FIG. 10. Specifically, the top wall 12A, the bottom wall 12B, and the two opposing side walls 12E and 12F, which are joined to and extend between the top and the bottom walls, define the wire locking cavity 28. The wire locking cavity 28 terminates in first and second ends which are respectively defined by the front end 12C and back end 12D of the housing 12. The first end of the wire locking cavity 28 includes a cavern 30 (FIGS. 11 and 12) which is sized and shaped to receive the wire engaging end 14A of the wire retaining key 14, and to accommodate the blocking shell 14C.

The housing 12 also includes a keyway 32 (FIG. 10) which is formed in the wire locking cavity 28 and which intercepts the two passageways 26. The keyway 32 is preferably defined by opposing slots 32A formed in the inside surfaces of the side walls 12E and 12F. The keyway 32 further includes two parallel top guiding rib members 38 (FIG. 10) protruding from the inside surface of the top wall 12A and which are substantially linearly coextensive with the length of the top wall 12A. Similarly, the keyway 32 includes two parallel bottom guiding rib members 40 protruding from the inside surface of the bottom wall 12B and which are substantially linearly coextensive with the length of the bottom wall 12B. The opposing slots 32A and the top and bottom guiding rib members 38 and 40 serve to guide the wire retaining key 14, inserted into the wire locking cavity 28, through the keyway 32 so that the key 14 intercepts a flexible wire 8 inserted through the passageways 26.

The keyway 32 also preferably includes a center bottom guiding rib member 42 (FIG. 10) formed parallel to and respectively equidistant between the two bottom guiding rib members 40. Like the other bottom guiding rib members 40, the center guiding rib member 42 also protrudes from the inner surface of the bottom wall 12B; however, the center guiding rib member 42 is preferably only linearly coextensive with approximately one third of the length of the bottom wall 12B. That is, the center rib member 42 begins at the front end 12C of the housing 12, immediately inwardly of the cavern 30, and terminates in the wire locking cavity 28 at a point approximately one third of the distance through the cavity 28. The center guiding rib member 42 permits the wire retaining key 14 to remain partially inserted in the keyway 32, preferably during shipping of the wire seal 10, by providing a structure against which the angled detent (no-return mechanism 14B) of the partially inserted key 14 may press so that the remainder of the key 14 is forced up against the top guiding rib members 38 and a top surface of each opposing slot 32A.

Further, as shown in FIG. 10, additional recesses 24A are preferably formed in the inner surfaces of the opposing side walls 12E and 12F to enhance the fragility of the side walls. The recesses 24A are slot-like in nature and run parallel to the opposing slots 32A of the keyway 32. The length of such slot-like recesses 24A may be coextensive with the length of the opposing slots 32A but are preferably formed to be only approximately the length of the cavern 30, i.e., from the front end 12C to the point inside the cavity 28 where the cavern 30 ends. There are preferably an equal number of slot-like recesses 24A above and below each slot 32A; however, similar to the recesses 24 formed on the outer surfaces of the top and bottom walls 12A and 12B of the housing, the number of slot-like recesses 24A formed may be varied during manufacturing in order to effect the degree of fragility of the side walls (e.g., more recesses yield a greater degree of fragility).

Figure 11:
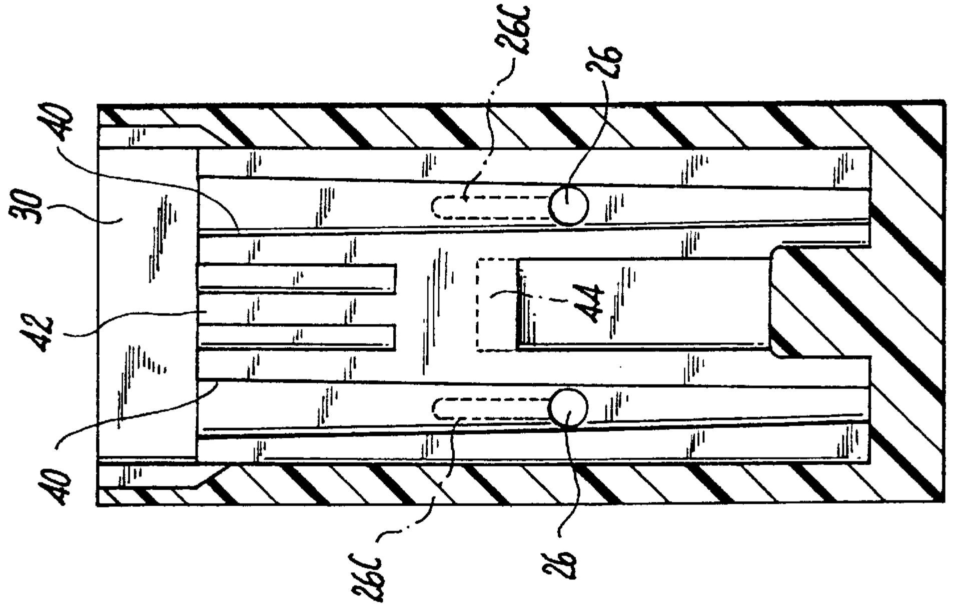
FIG. 11 is a cross-sectional plan view of the housing taken along line 11—11 of FIG. 10.
Figure 13:
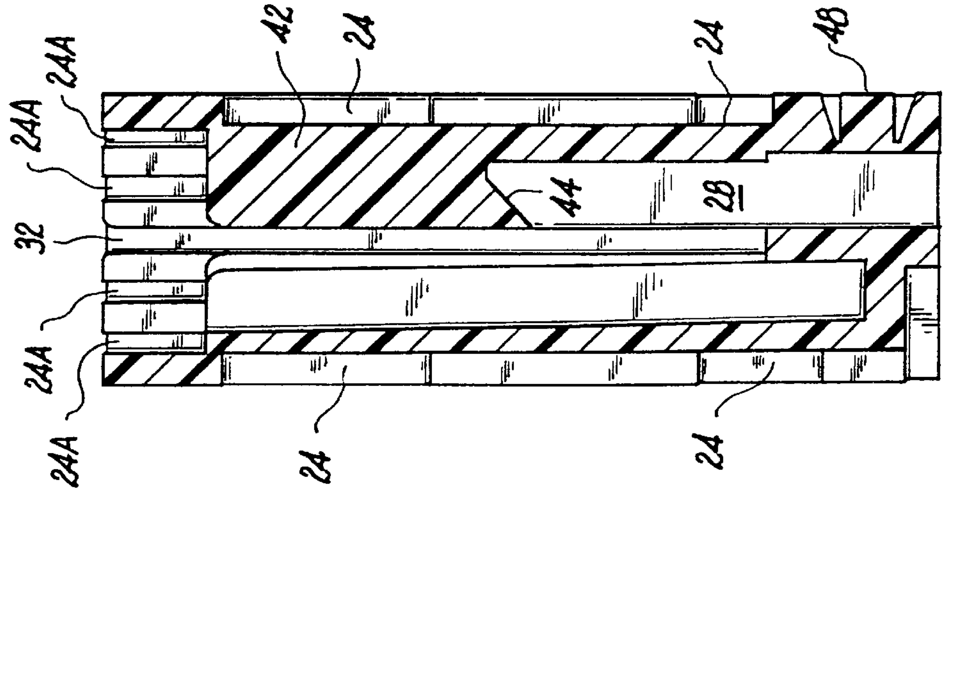
FIG. 13 is a cross-sectional side elevation view of the housing taken along line 13—13 of FIG. 9.

The wire locking cavity 28 of the housing 12 also includes a key removal preventer in the form of a no-return abutment 44, as shown in FIGS. 11 and 13. One of the purposes served by the no-return abutment 44 is to engage detent 14B of retaining key 14 so that the key 14 can not be removed from the housing 12 once fully inserted therein. The abutment 44 is shown in the embodiments herein as a receiving surface which is part of a notch formed in the inside surface of the bottom wall 12B. The receiving surface faces and is angled toward back end 12D of the housing 12 terminating approximately at a height equivalent to the height of the bottom guiding rib members 40 and 42. The no-return abutment 44 is located within the cavity 28 substantially at the point where the center guiding rib member 42 ends. It has been found that a preferred slope of the receiving surface of the no-return abutment 44 for securing the detent of the key 14 therein, e.g. approximately 45 degrees, is appropriate to enhance diversion of the detent away from the key so that the key cannot be removed by withdrawal from the keyway.

Figure 18:
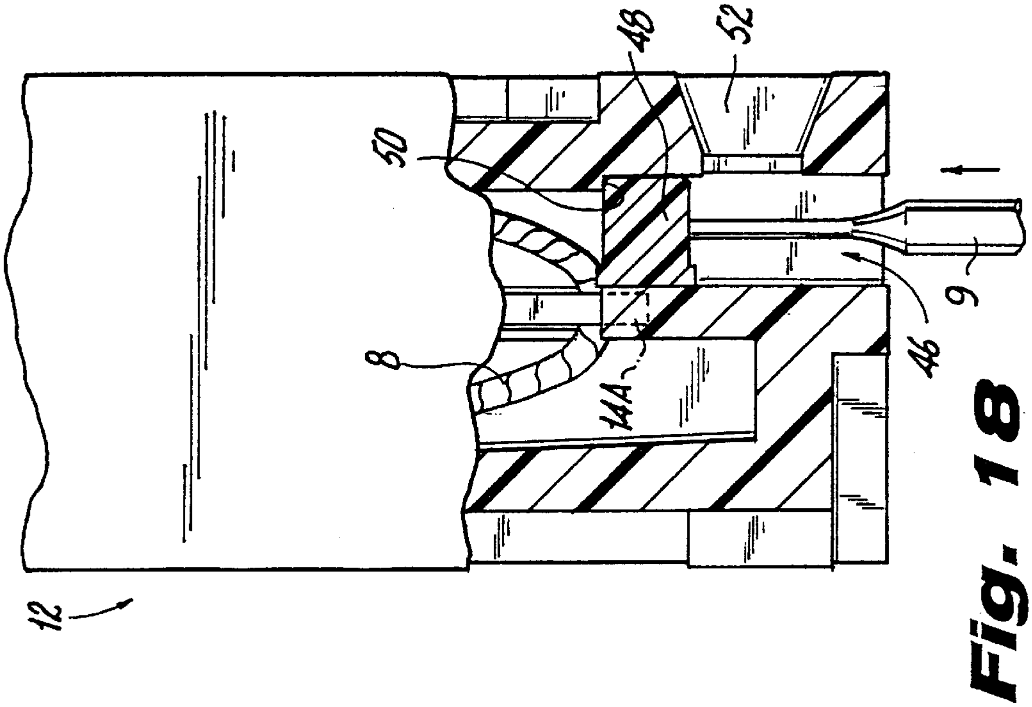
FIG. 18 is a partial cross-sectional side elevation view of the housing illustrating a tool moving the plug of FIG. 17 into a blocking position within the cavity.

A small opening 46 is present in the otherwise closed bottom wall 12D of the housing 12, as shown in FIG. 4. This small opening 46 is a by-product of a dye tool used to the molding process used to form the housing 12. Since such opening 46 might provide limited access to the wire locking cavity 28 for an unlocking tool, a plug 48 (FIGS. 17 and 18) for blocking access to the wire locking cavity 28 is provided as part of the housing 12. Preferably, the plug 48 is formed as a portion of the bottom wall 12B and has reduced side connections 48A to the bottom wall 12B. These reduced side connections 48A fracture under minimum force allowing the plug 48 to be moved into a blocking position within the cavity 28 with respect to the opening 46. Referring to FIG. 18, a preferred embodiment is shown where the plug 48 is forced into the passage 46 and moved beyond an opening 52 remaining after forcing the plug 48 into the blocking position.

Figure 16:
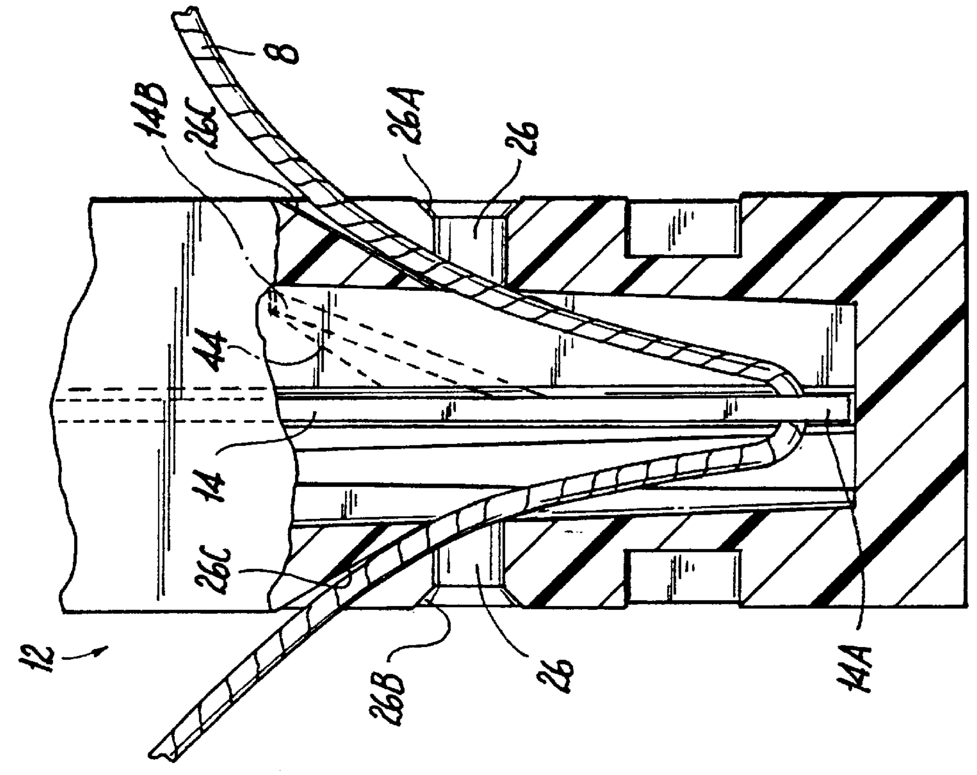
FIG. 16 is a partial cross-sectional side elevation view illustrating the wire retaining key fully inserted into the housing of the present wire seal.
Figure 15:
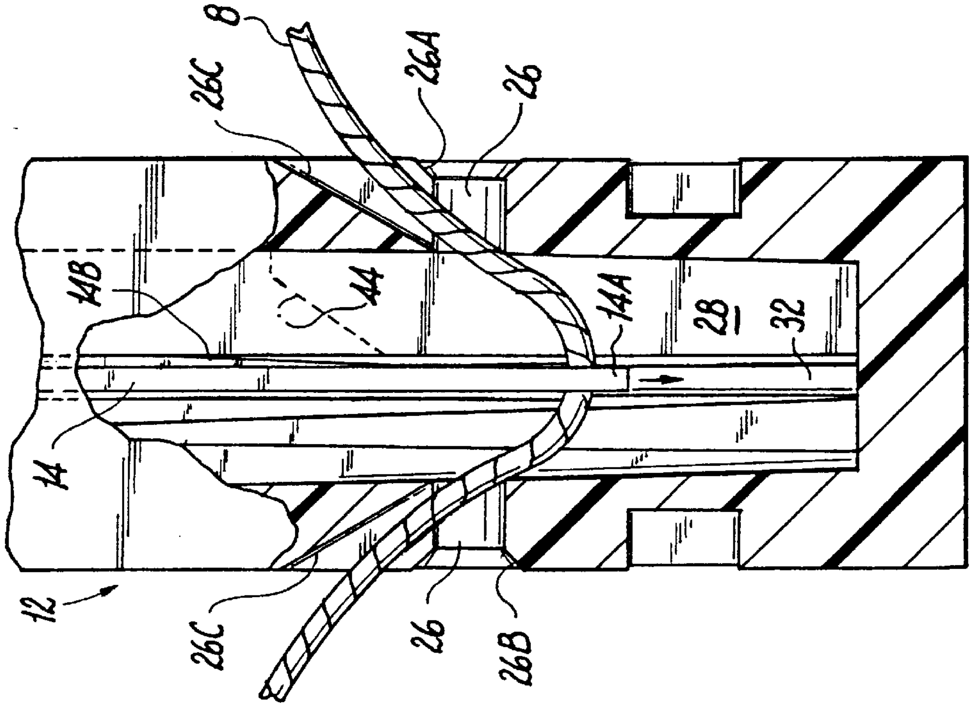
FIG. 15 is a partial cross-sectional side elevation view illustrating a wire retaining key intercepting a flexible wire in accordance with the present invention.

Given the above-described unique construction of the wire seal 10 of the present invention, the novel operation of the wire seal will now be explained. Referring now to FIGS. 15 and 16, the intercepting, deforming and retaining actions which the wire retaining key 14 performs on the flexible wire 8 are shown. Particularly, the wire retaining key 14 is inserted into the keyway 32 of the housing 12 at the front end 12C. The key 14 is guided through the keyway 32 and the wire locking cavity 28 via the opposing slots 32A and the top and bottom guiding rib members 38 and 40. The detent of the no-return mechanism 14B is forcibly pressed against the center bottom guiding rib member 42 as the key 14 is inserted into the keyway 32. As the key 14 passes through the keyway 32, the wire engaging portion 14A intercepts the flexible wire 8 passing through the passageways 26. The compound angle of the wire engaging portion 14A bears against flexible wire 8 to guide and compress flexible wire 8 (as shown and explained in the context of FIG. 8B) such that the flexible wire 8 is retained by the key 14 against removal from the housing 12.

Still referring to FIGS. 15 and 16, as the flexible wire 8 is intercepted by the key 14, the two portions of wire 8 respectively passing through the passageways 26 are deformed (i.e., bent) into a generally V-shaped condition at the wire engaging portion 14A of the key 14 (i.e., the notches forming the compound angles). Also, the flexible wire 8 is deformed (i.e., bent) at the point where the passageways 26 intersect wire locking cavity 28. Wire deformation relief notches 26C are provided at the openings of the ends of the passageways in order to facilitate assembly by lessening resistance to deformation experienced by the flexible wire 8 at such points. Relief is provided by permitting the flexible wire 8 to deform into notches 26C when the wire is being intercepted and forced into locking position by the key 14. In the absence of wire deformation relief notches 26C, the operation of assembling the key into the housing is more difficult and the risk of premature cracking or breaking is increased.

Figure 17:
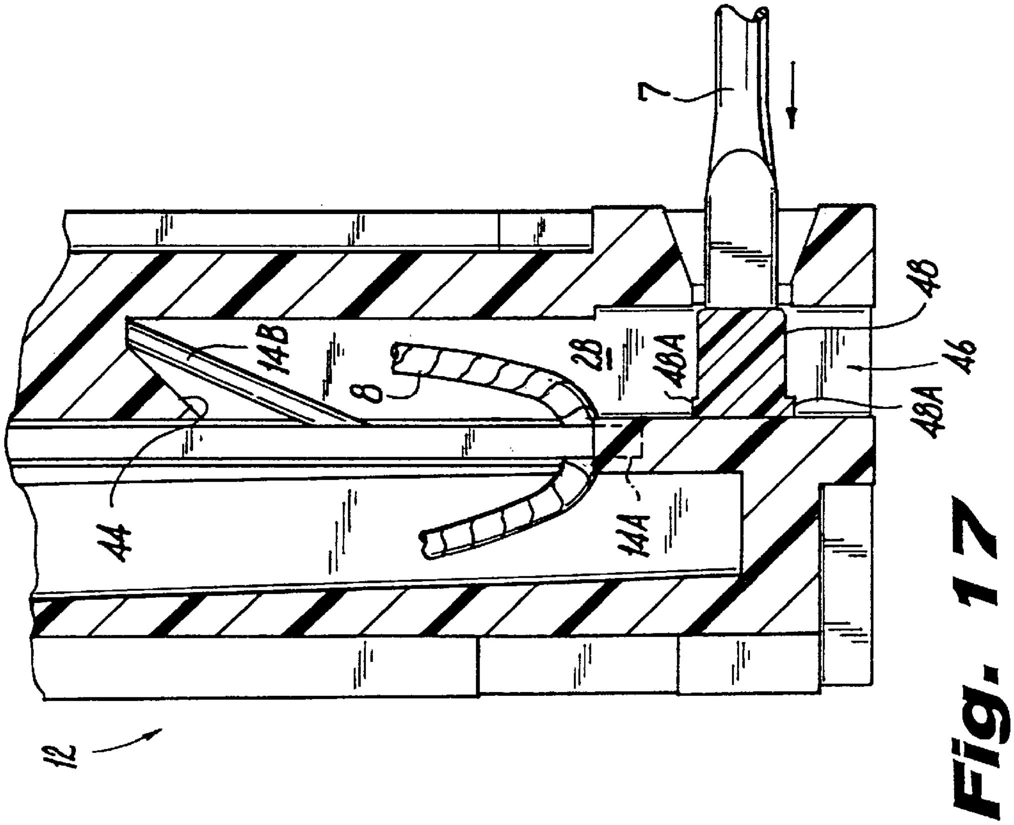
FIG. 17 is a partial cross-sectional side elevation view of the housing of the present wire seal illustrating the use of a tool to introduce a plug into a cavity of the housing.

The engagement between the no-return mechanism 14B and the no-return abutment 44 is shown in FIG. 17. As the detent 14B passes through the keyway 32 and then passes by the abutment 44, the detent snaps into the notch associated with the abutment 44. In this manner, once the detent engages abutment 44, as shown in FIG. 17, the receiving surface of the notch prevents the key 14 from being pulled back through the keyway 32 in a direction opposite to that of insertion. As the detent snaps into the notch, the user is provided with an audible indication, e.g., a snapping or clicking sound, to indicate to him that the key 14 is in the fully inserted position. If no audible indication is heard, then the user is warned that the key is either not fully inserted or not correctly inserted.

A preferred embodiment of the plug 48 for blocking access to the wire locking cavity 28 through the small opening 46, is shown in FIGS. 17 and 18. As mentioned previously, the plug 48 is preferably formed as part of the bottom wall 12B and has reduced side connections 48A. A handtool, shown as a screwdriver 7 in FIG. 17, can be used to apply a force to the plug 48 in a direction to break plug 48 away from the bottom wall 12B. The plug 48 is moved into the wire locking cavity 28, as shown in FIG. 17. A handtool, e.g., screwdriver 9 as shown in FIG. 18, can then be inserted into the small opening 46 to apply a force to the plug 48 in a direction parallel to the bottom wall 12B so that the plug 48 moves into a blocking position within the cavity 28 to prevent access therein through the small opening 46. The plug 48 may engage a stopping surface 50 formed on the inside surface of the bottom wall 12B so that the plug 48 may be pushed into the cavity 28 to a predetermined distance within the cavity 28. Also, the size (width and/or height) of the portion of the wire locking cavity 32 in which the plug 48 is pressed into may be formed to become progressively and uniformly smaller from the back end 12D to the front end 12C of the housing 12.

Referring now to FIGS. 19 and 20, respective partial cutaway views of the weakened slot-like recesses 24A and recesses 24 formed in the housing 12 are shown. Particularly, slot-like recesses 24A formed in at least one sidewall, 12E or 12F (or preferably both), will cause the particular sidewall to fracture if an attempt is made to remove the key 14 from the housing 12, once the key 14 is fully inserted into the keyway 32 (i.e., the no-return mechanism 14B is engaged with the no-return abutment 44). Similarly, recesses 24 are formed in the top or bottom walls, 12A and 12B (or preferably both), as shown in FIG. 20, to provide the same advantageous fracturing effect. It is to be appreciated that, as shown in FIGS. 19 and 20, the slot-like recesses 24A and portions of the recesses 24 are formed in the housing 12 near where the blocking shell 14C of the key 14 is positioned when the key 14 is fully inserted. In this way, if an attempt is made at prying the key 14 from the housing 12 near the blocking shell 14C, the housing 12 will fracture in this area leaving visible evidence of the tampering.

Figure 21:
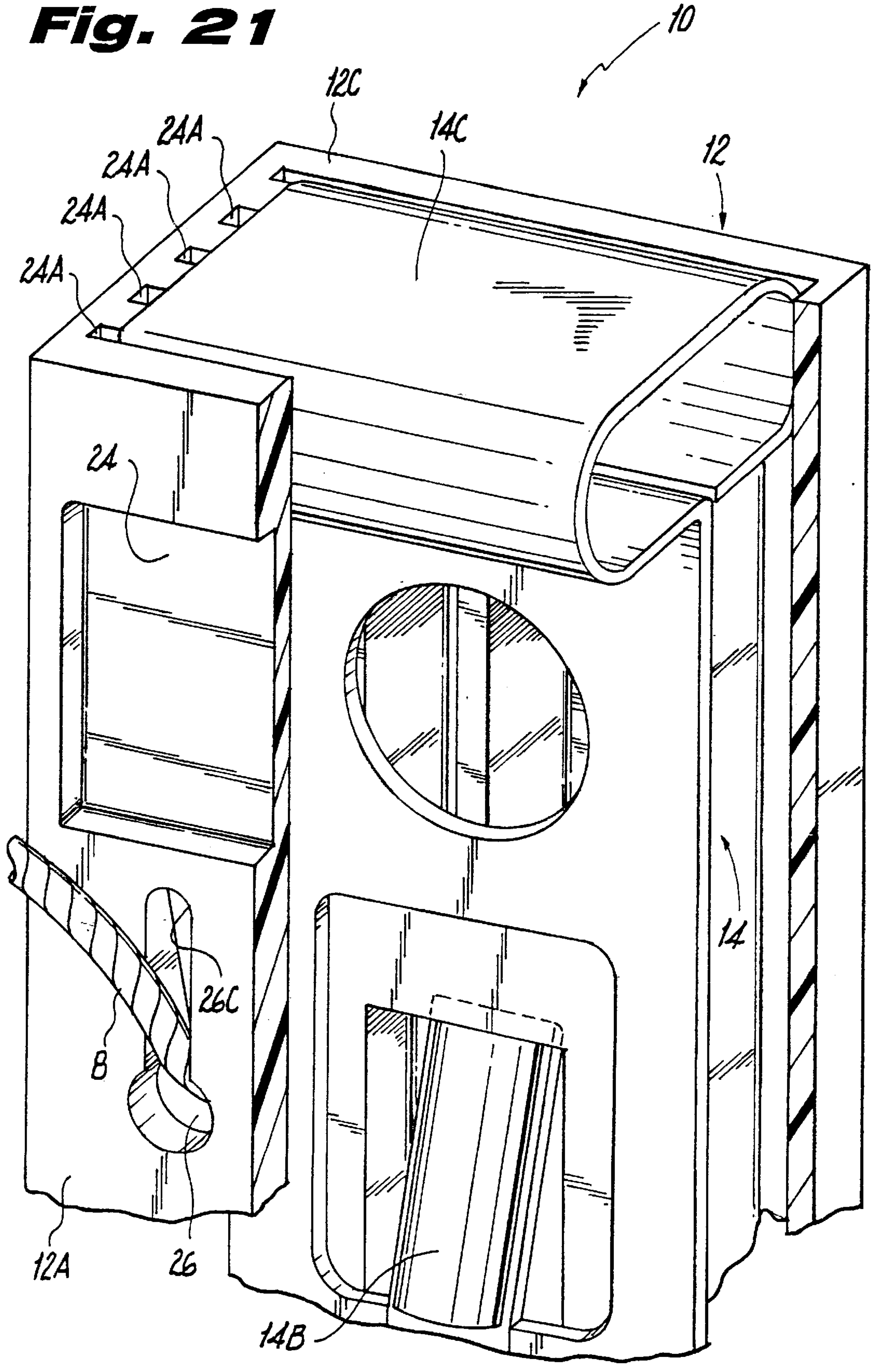
FIG. 21 is a partial cross-sectional perspective view of the present wire seal.
Figure 22A:
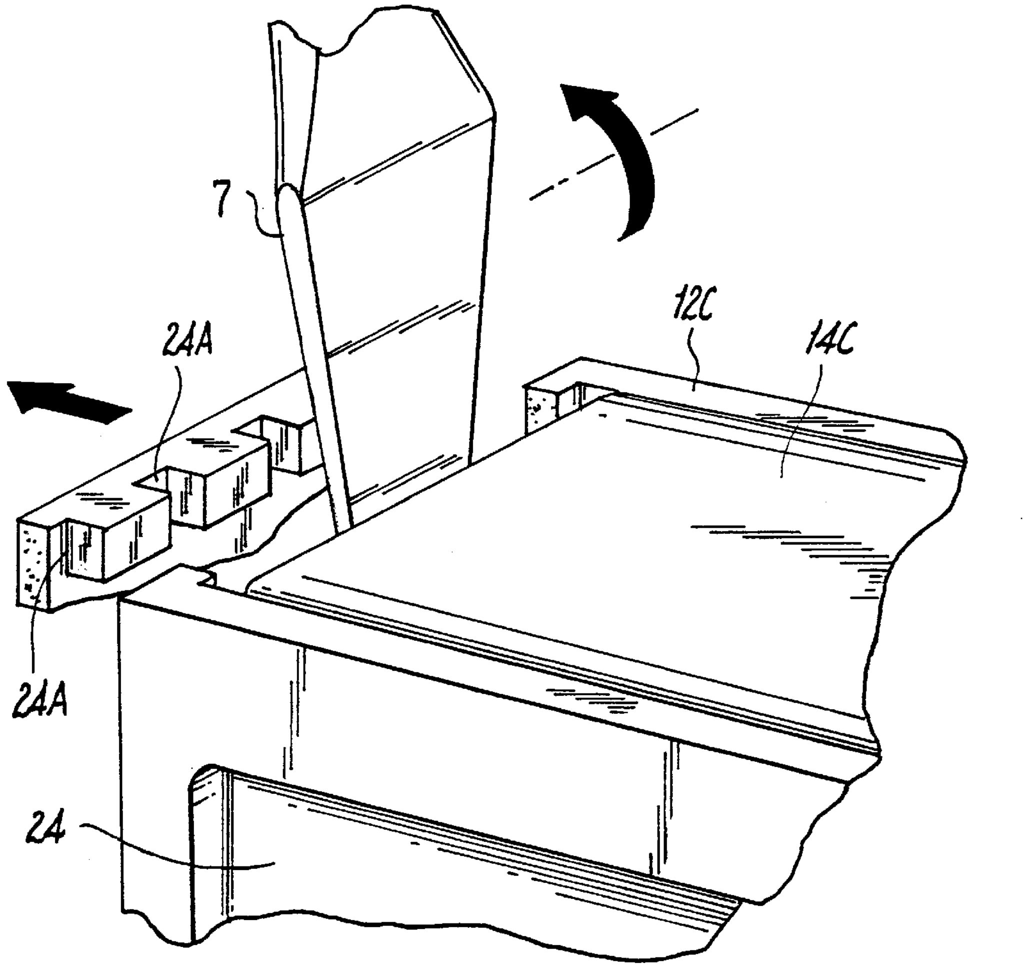
FIG. 22A is a partial cross-sectional perspective view of the wire seal of FIG. 21 illustrating a tool being used to attempt to remove the wire retaining key from the housing.
Figure 22B:
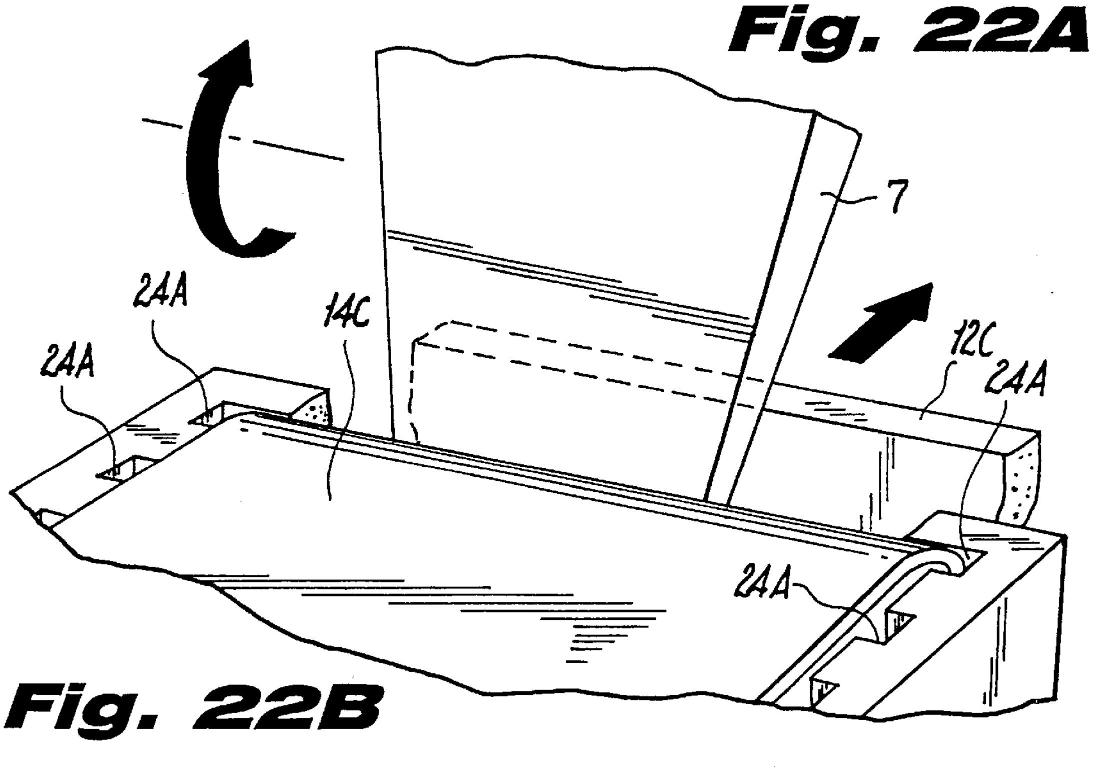
FIG. 22B is a partial cross-sectional perspective view of the wire seal of FIG. 21 illustrating the further use of a tool to attempt to remove the wire retaining key from the housing.

By way of example, FIGS. 21, 22A and 22B illustrate the advantageous fracturing effect caused by the breakable plastic composition of the housing 12 and the recesses 24 and 24A formed in the walls thereof. A partially cutaway view of the housing 12 and the wire retaining key 14 are shown in FIG. 21 with weakened areas 24A formed in the sidewalls 12E and 12F and recesses 24 formed in the top and bottom walls 12A and 12B. FIG. 22A shows the effect of attempting to insert a tool in between the sidewall, 12E or 12F, of the housing and the blocking shell 14C of the key 14, namely, a portion of the sidewall breaking off to advantageously provide evidence of the tampering. FIG. 22B shows that a similar result occurs if the tampering tool is inserted between either the top or bottom wall, 12A or 12B, and the blocking shell 14C.

Figure 24:
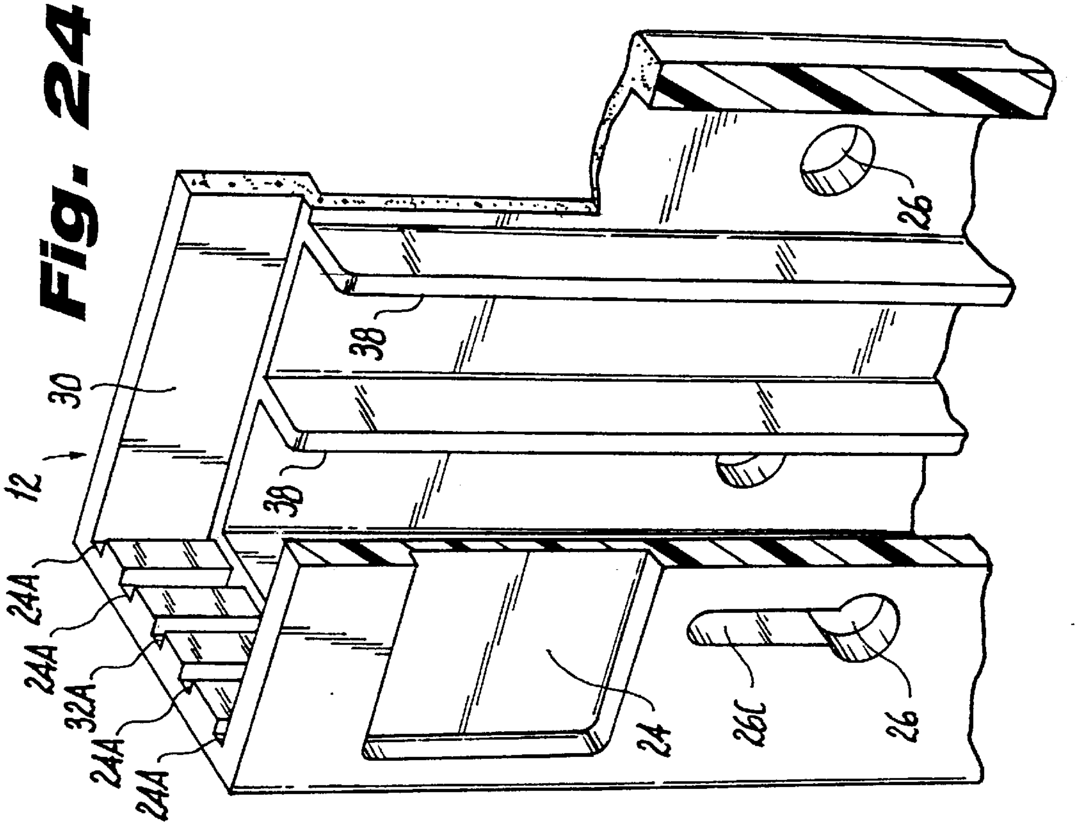
FIG. 24 is a partial cross-sectional perspective view of the housing of FIG. 23 illustrating the housing broken away along the fracture line.
Figure 23:
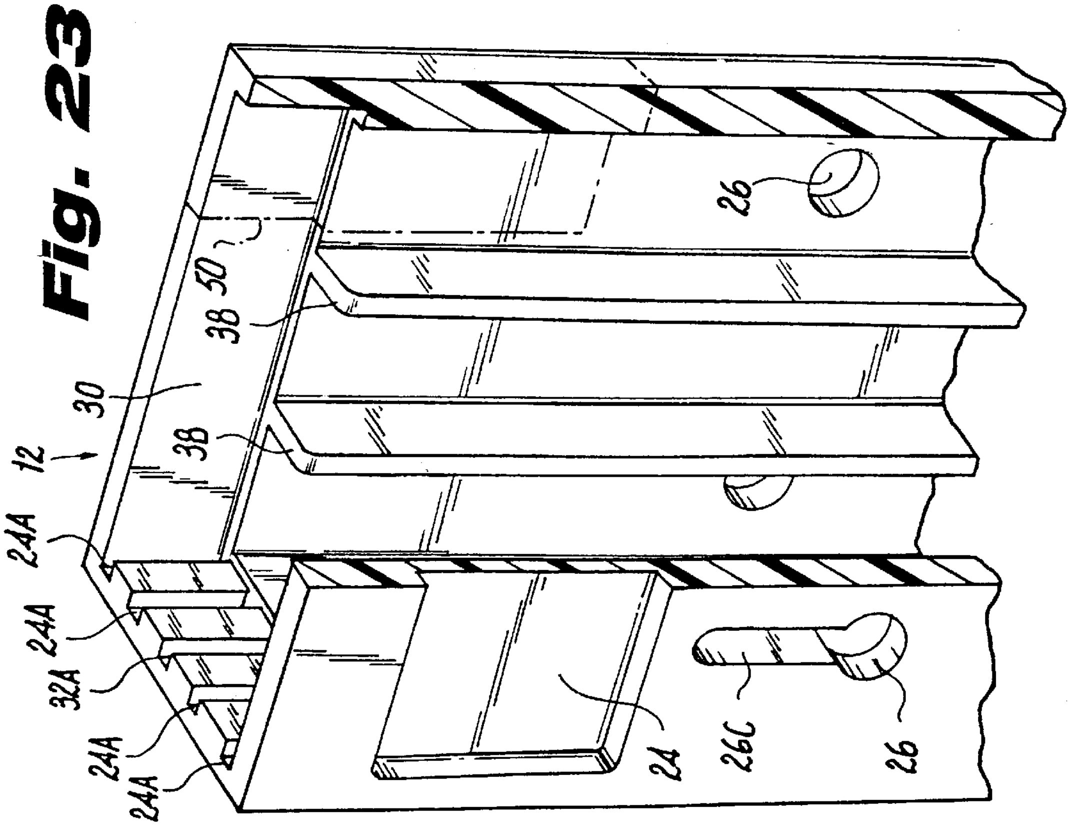
FIG. 23 is a partial cross-sectional perspective view of the housing of the present wire seal illustrating a fracture line which may result from attempting to remove the wire retaining key or wire from the housing.

Another method of tampering with the wire seal 10 may include attempts at pulling directly on the blocking shell 14C of the wire retaining key 14 in an effort to forcibly remove the key 14 from the housing 12. Still further, it is foreseen that a perpetrator may try to pull on the flexible wire 8 secured by the key 14 in the housing 12. FIG. 23 shows an example of a fracture line 50 that may possibly result in the housing 12 if either method of tampering were attempted. FIG. 24 shows the resulting partial view of the housing 12 after the fractured portion breaks off at the fracture line 50. It is to be appreciated that, while one skilled in the art of wire seal tampering will be able to contemplate a variety of other methods of tampering with the wire seal 10 of the present invention, all such methods will result in visible evidence of such tampering and, therefore, frustrate the perpetrator's intentions.

Figure 25:
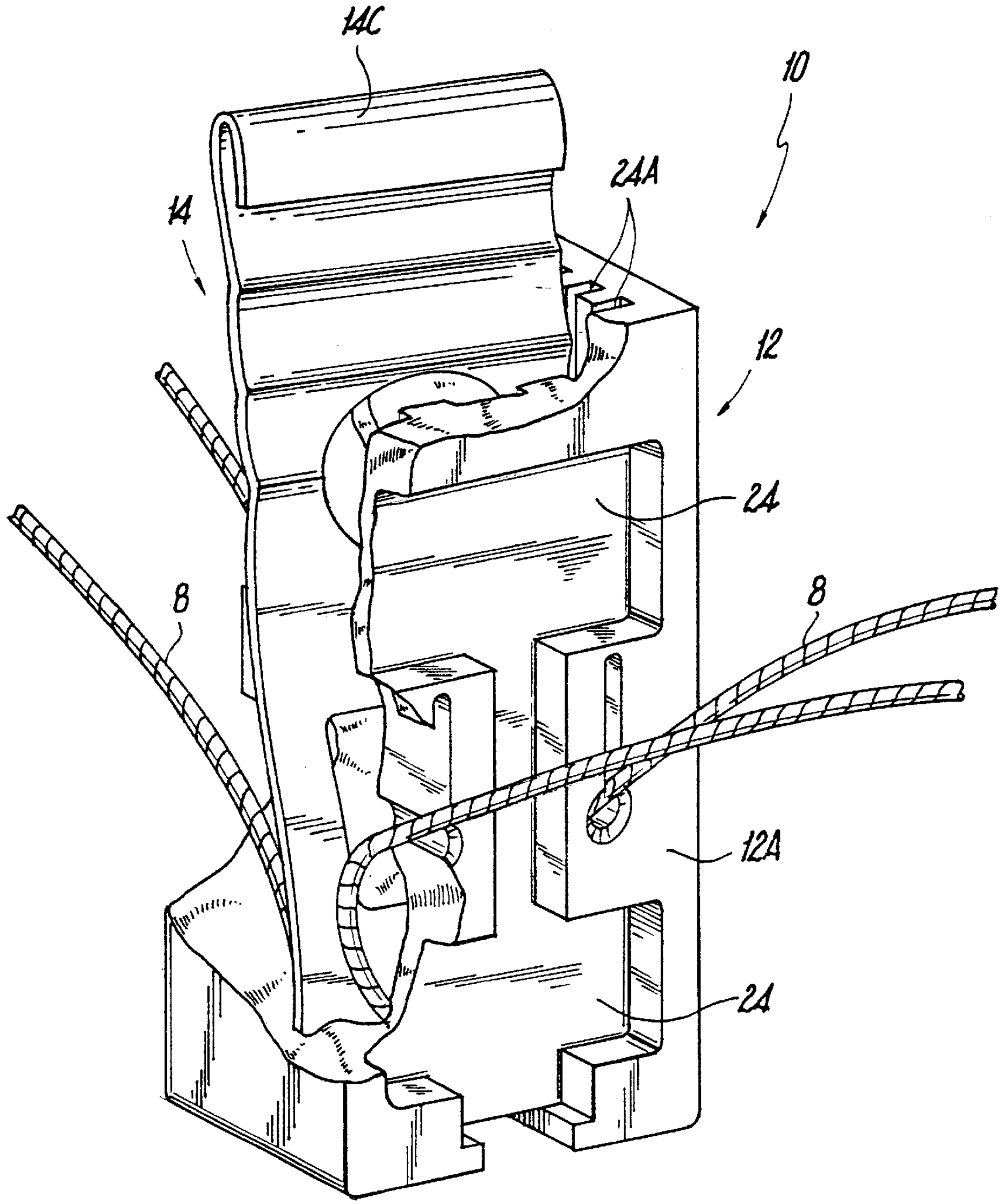
FIG. 25 is a top perspective view of the present wire seal exemplifying the housing after tampering.

Yet another exemplary illustration of the results of an attempt at tampering with the wire seal 10 is shown in FIG. 25. In this instance, the blocking shell 14C has been deformed in an effort to forcibly pull the key 14 from the housing 12. Again, the resulting fractured housing 12 provides evidence of the tampering and, thus, negates the perpetrator's attempts to mask his tampering with the equipment or item to which the wire seal 10 is attached.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A seal adapted for use with a flexible wire, comprising:

(a) a housing having (i) a top wall, a bottom wall, a front end, a back end, and opposing side walls, at least one passageway extending between said top and bottom walls for passage of a flexible wire through said housing, each of said top and bottom walls defining an entrance opening to said passageway, at least one of said entrance openings having an elongated wire deformation relief notch, and (ii) a keyway intersecting said passageway and including an opening in said front end of said housing; and (b) a wire retaining key which is sized and shaped for insertion into said keyway, said key including a body having an end portion including at least one wire notch, and a locking element capable of permanently locking said key to said housing when said key is positioned in said keyway.

2. The seal of claim 1 wherein said housing has two said passageways extending between said top and bottom walls and said end portion includes two notches.

3. The seal of claim 1 wherein said housing includes a weakened portion designed to be easily broken.

4. The seal of claim 3 wherein said housing is plastic.

5. The seal of claim 1 wherein said housing has a silhouette which is substantially a rectangular parallelepiped.

6. The seal of claim 1 wherein said back end of said housing is substantially closed.

7. The seal of claim 1 including opposing slots formed in the inside surfaces of said side walls, said opposing slots defining opposite sides of said keyway.

8. The seal of claim 7 wherein said keyway further comprises at least one top guiding rib member protruding from the inside surface of said top wall and extending linearly substantially the length of said top wall.

9. The seal of claim 1 wherein said keyway further comprises at least one bottom guiding rib member protruding from the inside surface of said bottom wall and extending linearly substantially the length of said bottom wall.

10. The seal of claim 1 wherein said housing includes a first detent, said locking element of said key includes a second detent, said second detent being capable of engaging said first detent when said key is fully inserted within said keyway, thereby permanently locking said key within said housing.

11. The seal of claim 1 wherein said wire engaging portion of said key comprises a generally V-shaped notch having two sides which meet at a wire retaining convergence.

12. A seal as described in claim 1 wherein each of said relief notches includes a surface sloping outwardly from one of said entrance openings.

13. A seal as described in claim 12 wherein said sloping surface of said relief notch is bounded by surfaces of said housing.

14. A seal as described in claim 1 wherein said wire retaining key is stamped from a single piece of metal, and includes a substantially flat body having a flat surface, and a detent pivotably secured to said body and extending at an acute angle with respect to said flat surface.

15. A seal adapted for use with a flexible wire, comprising:

(a) a housing having (i) a top wall, a bottom wall, a front end, a back end, and opposing side walls, at least one passageway extending between said top and bottom walls for passage of a flexible wire through said housing, each of said top and bottom walls defining an entrance opening to said passageway, and (ii) a keyway intersecting said passageway and including an opening in said front end of said housing; and (b) a wire retaining key which is sized and shaped for insertion into said keyway, said key including a body having an end portion including at least one wire notch, said wire notch comprising a generally V-shaped notch having two sides which meet at a wire retaining convergence, said sides of said V-shaped notch being symmetrical and comprising a compound angle having at least two receiving angles for receipt of and directing a wire to said convergence, and a locking element capable of permanently locking said key to said housing when said key is positioned in said keyway.

16. A seal as described in claim 15 wherein said wire retaining key includes a flat body stamped from a single piece of metal, and a detent pivotally secured to said flat body and extending at an acute angle with respect to said flat body.

17. A seal adapted for use with a flexible wire, comprising:

(a) a housing having (i) a top wall, a bottom wall, a front end, a back end, and opposing side walls, at least one passageway extending between said top and bottom walls for passage of a flexible wire through said housing, each of said top and bottom walls defining an entrance opening to said passageway, and (ii) a keyway intersecting said passageway and including an opening in said front end of said housing; and (b) a wire retaining key which is sized and shaped for insertion into said keyway, said key including a body having an end portion including at least one wire notch, said wire notch comprising a generally V-shaped notch having two sides which meet at a wire retaining convergence, said convergence being arcuately shaped, and a locking element capable of permanently locking said key to said housing when said key is positioned in said keyway.

18. A seal as described in claim 16 wherein said wire retaining key includes a flat body stamped from a single piece of metal, and a detent pivotally secured to said flat body and extending at an acute angle with respect to said flat body.

* * * * *

UNITED STATES PATENT AND TRADEMARK OFFICE
CERTIFICATE OF CORRECTION

PATENT NO. : 6,082,789

DATED : July 4, 2000

INVENTOR(S) : Joseph H.C. Wenk

It is certified that error appears in the above-identified patent and that said Letters Patent are hereby corrected as shown below:

On page 1, title, now reads "TEMPER DETERRENT WIRE SEAL"
should read -- TAMPER DETERRENT WIRE SEAL --

In column 1, line 1, now reads "TEMPER DETERRENT WIRE SEAL"
should read -- TAMPER DETERRENT WIRE SEAL --

In column 8, line 32 , now reads "the first receiving angle a being defined as"
should read -- the first receiving angle $\alpha$ being defined as --

Signed and Sealed this

Seventeenth Day of April, 2001

*Attest:*

NICHOLAS P. GODICI

*Attesting Officer* *Acting Director of the United States Patent and Trademark Office*